(12) United States Patent
Yamashita et al.

(10) Patent No.: US 8,943,847 B2
(45) Date of Patent: Feb. 3, 2015

(54) AIR CONDITIONING APPARATUS

(75) Inventors: Koji Yamashita, Tokyo (JP); Hiroyuki Morimoto, Tokyo (JP); Yuji Motomura, Tokyo (JP); Shinichi Wakamoto, Tokyo (JP); Naofumi Takenaka, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 449 days.

(21) Appl. No.: 13/391,444

(22) PCT Filed: Sep. 10, 2009

(86) PCT No.: PCT/JP2009/065855
§ 371 (c)(1),
(2), (4) Date: Feb. 21, 2012

(87) PCT Pub. No.: WO2011/030429
PCT Pub. Date: Mar. 17, 2011

(65) Prior Publication Data
US 2012/0151949 A1 Jun. 21, 2012

(51) Int. Cl.
F25B 13/00 (2006.01)
F24F 3/06 (2006.01)
(Continued)

(52) U.S. Cl.
CPC ............... *F24F 3/06* (2013.01); *F24F 11/008* (2013.01); *F25B 13/00* (2013.01); *F25B 25/005* (2013.01); *F25B 2313/0231* (2013.01); *F25B 2313/02732* (2013.01); *F25B 2313/02741* (2013.01); *F25B 2313/006* (2013.01); *F25B 2313/007* (2013.01);
(Continued)

(58) Field of Classification Search
CPC .............. F25B 5/00; F25B 5/02; F25B 13/00; F25B 29/003; F25B 30/02; F25B 2313/0231
USPC ............................ 62/159, 160, 185, 200, 201
See application file for complete search history.

(56) References Cited

U.S. PATENT DOCUMENTS

2011/0185754 A1* 8/2011 Yamashita et al. .............. 62/132
2012/0006050 A1* 1/2012 Takayama et al. .............. 62/513
(Continued)

FOREIGN PATENT DOCUMENTS

JP 3-017475 A 1/1991
JP 5-280818 A 10/1993
(Continued)

OTHER PUBLICATIONS

Office Action dated Dec. 9, 2013, issued by the Chinese Patent Office in corresponding Chinese Patent Application No. 200980161356.0, and an English Translation of the Office Action. (7 pages).
(Continued)

*Primary Examiner* — Marc Norman
(74) *Attorney, Agent, or Firm* — Buchanan Ingersoll & Rooney PC

(57) ABSTRACT

To provide an air-conditioning apparatus capable of achieving energy saving. An air-conditioning apparatus controls first heat medium flow switching devices and second heat medium flow switching devices in a heating only operation mode and a cooling only operation mode such that a flow rate through which a heat medium circulates is formed between all of the heat exchangers related to heat medium and at least one of use side heat exchangers.

10 Claims, 10 Drawing Sheets

(51) Int. Cl.
*F24F 11/00* (2006.01)
*F25B 25/00* (2006.01)

(52) U.S. Cl.
CPC . *F25B 2313/0272* (2013.01); *F25B 2313/0314* (2013.01); *F25B 2600/13* (2013.01); *F25B 2700/21* (2013.01); *Y02B 30/745* (2013.01)
USPC ................................ 62/159; 62/185; 62/200

(56) References Cited

U.S. PATENT DOCUMENTS

2012/0036887 A1* 2/2012 Wakamoto et al. .............. 62/513
2014/0130528 A1* 5/2014 Morimoto et al. .............. 62/129

FOREIGN PATENT DOCUMENTS

| JP | 09-010075 A | 1/1997 |
|---|---|---|
| JP | 2001-289465 A | 10/2001 |
| JP | 2002-106995 A | 4/2002 |
| JP | 2003-343936 A | 12/2003 |
| JP | 2004-053069 A | 2/2004 |
| JP | 2005-140444 A | 6/2005 |

OTHER PUBLICATIONS

International Search Report (PCT/ISA/210) issued on Dec. 22, 2009, by Japanese Patent Office as the International Searching Authority for International Application No. PCT/JP2009/065855.

Office Action from Japanese Patent Office dated Jan. 29, 2013, issued in corresponding Japanese Patent Appln. No. 2011-530684, with English translation thereof (8 pages).

Japanese Office Action (Decision of Rejection) dated Jul. 2, 2013, issued by the Japanese Patent Office in corresponding Japanese Patent Application No. 2011-530684, and English language translation of Office Action. (4 pages).

* cited by examiner

AIR CONDITIONING APPARATUS

TECHNICAL FIELD

The present invention relates to an air-conditioning apparatus which is applied to, for example, a multi-air-conditioning apparatus for a building.

BACKGROUND ART

In an air-conditioning apparatus, such as a multi-air-conditioning apparatus for a building, a refrigerant is circulated between an outdoor unit, functioning as a heat source unit, disposed outside a structure and an indoor unit disposed inside an indoor space of the structure, for example. The refrigerant rejects or receives heat, and with the heated or cooled air, heats or cools a conditioned space. As regards the refrigerant, for example, HFC (hydrofluorocarbon) is often used. An air-conditioning apparatus using a natural refrigerant, such as carbon dioxide ($CO_2$), has also been proposed.

Furthermore, in an air-conditioning apparatus called a chiller, cooling energy or heating energy is generated in a heat source unit disposed outside a structure. Water, antifreeze, or the like is heated or cooled by a heat exchanger disposed in an outdoor unit and is carried to an indoor unit, such as a fan coil unit or a panel heater, for heating or cooling (refer to Patent Literature 1 for example).

Moreover, an air-conditioning apparatus called a waste heat recovery chiller is constructed such that a heat source unit and each indoor unit are connected through four water pipes arranged therebetween and, for example, cooled water and heated water are simultaneously supplied so that cooling or heating can be freely selected in the indoor unit (refer to Patent Literature 2, for example).

Furthermore, an air-conditioning apparatus is constructed such that a heat exchanger for a primary refrigerant and a secondary refrigerant is disposed near each indoor unit to carry the secondary refrigerant to the indoor unit (refer to Patent Literature 3, for example).

Furthermore, an air-conditioning apparatus is constructed such that an outdoor unit is connected to each branching unit including a heat exchanger through two pipes to carry a secondary refrigerant to an indoor unit (refer to Patent Literature 4, for example).

CITATION LIST

Patent Literature

Patent Literature 1: Japanese Unexamined Patent Application Publication No. 2005-140444 (Page 4, FIG. 1, for example)

Patent Literature 2: Japanese Unexamined Patent Application Publication No. 5-280818 (Pages 4, 5, FIG. 1, for example)

Patent Literature 3: Japanese Unexamined Patent Application Publication No. 2001-289465 (Pages 5 to 8, FIGS. 1 and 2, for example)

Patent Literature: Japanese Unexamined Patent Application Publication No. 2003-343936 (Page 5, FIG. 1)

SUMMARY OF INVENTION

Technical Problem

In an air-conditioning apparatus of a related-art, such as a multi-air-conditioning apparatus for a building, because a refrigerant is circulated up to an indoor unit, the refrigerant may leak into, for example, an indoor space. In such air-conditioning apparatuses disclosed in Patent Literature 1 and Patent Literature 2, the refrigerant does not pass through the indoor unit. However, in the air-conditioning apparatuses disclosed in Patent Literature 1 and Patent. Literature 2, the heat medium is heated or cooled in a heat source unit disposed outside a structure and needs to be conveyed to the indoor unit. Accordingly, a circulation path for the heat medium is long. In this case, to carry heat for a predetermined heating or cooling work using the heat medium, the amount of energy consumed as conveyance power is larger than that used by the refrigerant. As the circulation path becomes longer, the conveyance power becomes markedly large. This indicates that energy saving is achieved if the circulation of the heat medium can be properly controlled in the air-conditioning apparatus.

In the air-conditioning apparatus disclosed in Patent Literature 2, the four pipes have to be arranged to connect each indoor unit to an outdoor unit so that cooling or heating can be selected in each indoor unit. Disadvantageously, ease of construction is poor. In the air-conditioning apparatus disclosed in Patent Literature 3, secondary medium circulating means, such as a pump, has to be provided in each indoor unit. Disadvantageously, the cost of such a system is high and noise is also high, and thus the apparatus is not practical. Furthermore, since the heat exchanger is placed near each indoor unit, the risk of leakage of the refrigerant into a place near an indoor space cannot be eliminated.

In the air-conditioning apparatus disclosed in Patent Literature 4, a primary refrigerant that has heat exchanged flows into the same path as that for the primary refrigerant before heat exchange, Accordingly, in the case in which a plurality of indoor units is connected, it is difficult for each indoor unit to exhibit its maximum capacity. Such configuration wastes energy. Furthermore, each branching unit is connected to an extension pipe through two pipes for cooling and two pipes for heating, i.e., four pipes in total, Consequently, this configuration is similar to that of a system in which the outdoor unit is connected to each branching unit through four pipes. Accordingly, the ease of construction of such system is poor.

The present invention has been made to overcome the above-described problem and a first object of the invention is to provide an air-conditioning apparatus that exhibits improved safety without the circulation of a refrigerant in or near an indoor unit and furthermore achieves energy saving. Furthermore to the first object, a second object of the invention is to provide an air-conditioning apparatus that achieves improved ease of construction and improved energy efficiency by reducing the number of pipes connecting an outdoor unit to a branching unit or indoor unit.

Solution to Problem

An air-conditioning apparatus according to the invention includes at least a compressor; a heat source side heat exchanger; a plurality of expansion devices; a plurality of heat exchangers related to heat medium; a plurality of pumps; and a plurality of use side heat exchangers, the compressor, the heat source side heat exchanger, the expansion devices, and the heat exchangers related to heat medium being connected to form a refrigerant circuit in which a heat-source-side refrigerant is circulated, the pumps, the use side heat exchangers, and the heat exchangers related to heat medium being connected to form a plurality of heat medium circuit in which a heat medium is circulated, the air-conditioning apparatus being capable of carrying out: a heating only operation mode in which a high-temperature high-pressure heat-source-side refrigerant discharged from the compressor flows into each of the heat exchangers related to heat medium to heat the heat medium; a cooling only operation mode in which a low-temperature low-pressure heat-source-side refrigerant flows into each of the heat exchangers related to heat medium to cool the heat medium; and a cooling and heating mixed operation mode in which a high-temperature high-pressure heat-source-side refrigerant discharged from the compressor flows into one of the heat exchangers related to heat medium to heat the heat medium and a low-temperature low-pressure heat-source-side refrigerant flows into another one of the heat exchangers related to heat medium to cool the heat medium, the apparatus comprising: a first heat medium flow switching device provided on an outlet side of each of the use side heat exchangers, the device switching flow paths between the outlet side of the use side heat exchanger and the heat exchangers related to heat medium; and a second heat medium flow switching device provided on an inlet side of each of the use side heat exchangers, the device switching flow paths between the inlet side of the use side heat exchanger and the heat exchangers related to heat medium, wherein in the cooling and heating mixed operation mode, the first heat medium flow switching devices and the second heat medium flow switching devices are controlled such that a flow path through which the heat medium circulates is formed between the heat exchanger related to heat medium heating the heat medium and at least one of the use side heat exchangers and a flow path through which the heat medium circulates is formed between the heat exchanger related to heat medium cooling the heat medium and at least one of the use side heat exchangers, and in the heating only operation mode and the cooling only operation mode, the first heat medium flow switching devices and the second heat medium flow switching devices are controlled such that a flow path through which the heat medium circulates is formed between all of the heat exchangers related to heat medium and at least one of the use side heat exchangers.

Advantageous Effects of Invention

According to the invention, flow paths between the use side heat exchangers and the heat exchangers related to heat medium are changed for each operation mode, and a flow path in which the heat medium circulates in the same direction in every operation mode is formed, thus achieving energy saving.

DESCRIPTION OF EMBODIMENT

An Embodiment of the invention will be described below with reference to the drawings.

Figure 1:
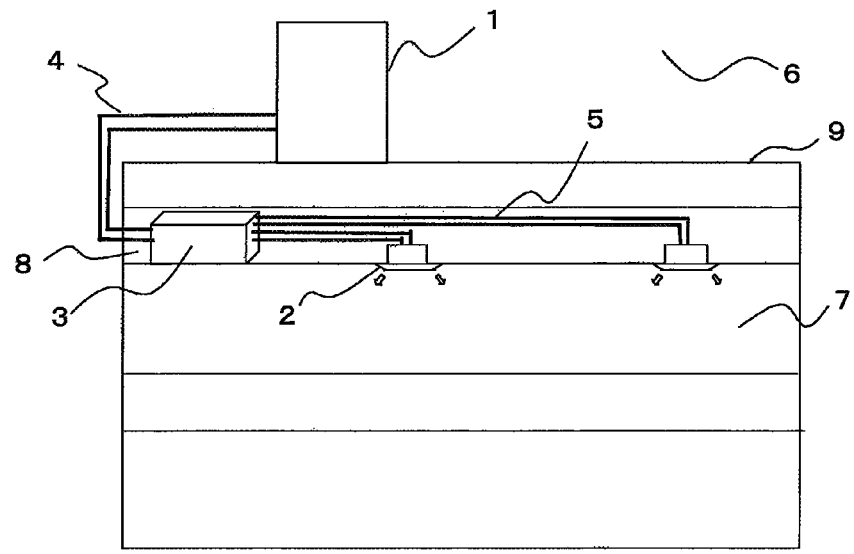
FIG. 1 is a schematic diagram illustrating an installation of an air-conditioning apparatus according to an Embodiment of the invention.
Figure 2:
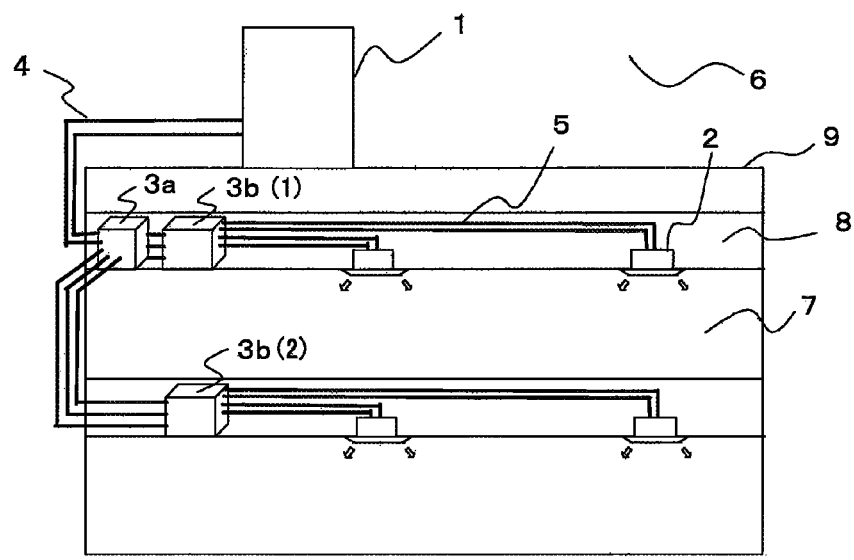
FIG. 2 is a schematic diagram illustrating an installation of the air-conditioning apparatus according to the Embodiment of the invention.

FIGS. 1 and 2 are schematic diagrams illustrating installations of an air-conditioning apparatus according to the Embodiment of the invention. The installations of the air-conditioning apparatus will be described with reference to FIGS. 1 and 2. This air-conditioning apparatus uses refrigeration cycles (a refrigerant circuit A, heat medium circuit B) in each of which a refrigerant (a heat-source-side refrigerant or a heat medium) is circulated such that a cooling mode or a heating mode can be freely selected as an operation mode in each indoor unit. Furthermore, the dimensional relationship among components in the below figures including FIG. 1 may be different from the actual ones.

Referring to FIG. 1, the air-conditioning apparatus according to the Embodiment includes an outdoor unit 1, which is a heat source unit, a plurality of indoor units 2, and a relay unit 3 disposed between the outdoor unit 1 and the indoor units 2. The relay unit 3 exchanges heat between the heat-source-side refrigerant and the heat medium. The outdoor unit 1 is connected to the relay unit 3 via refrigerant pipes 4 through which the heat-source-side refrigerant is conveyed. The relay unit 3 is connected to each indoor unit 2 via pipes 5 through which the heat medium is conveyed. Cooling energy or heating energy generated in the outdoor unit 1 is delivered through the relay unit 3 to the indoor units 2.

Referring to FIG. 2, the air-conditioning apparatus according to the Embodiment includes an outdoor unit 1, a plurality of indoor units 2, a plurality of separated relay units 3 (a main relay unit 3a, sub relay units 3b) arranged between the outdoor unit 1 and the indoor units 2. The outdoor unit 1 is connected to the main relay unit 3a through the refrigerant pipes 4. The main relay unit 3a is connected to the sub relay units 3b through the refrigerant pipes 4. Each sub relay unit 3b is connected to the indoor units 2 through the pipes 5. Cooling energy or heating energy generated in the outdoor unit 1 is delivered through the main relay unit 3a and the sub relay units 3b to the indoor units 2.

The outdoor unit 1 typically disposed in an outdoor space 6 which is a space (e.g., a roof) outside a structure 9, such as a building supplies cooling energy or heating energy through the relay units 3 to the indoor unit 2. Each indoor unit 2 is disposed in a position where cooling air or heating air can be supplied to an indoor space 7, which is a space (e.g., a living room) inside the structure 9, and is configured to supply the cooling air or heating air to the indoor space 7, which is an air conditioning space. Each relay unit 3 is configured so that it can be disposed in a position different from those of the outdoor space 6 and the indoor space 7, as a housing separate from the housings of the outdoor unit 1 and the indoor units 2, Each relay unit 3 is connected to the outdoor unit 1 through the refrigerant pipes 4 and is connected to the indoor units 2 through the pipes 5 to transfer cooling energy or heating energy, supplied from the outdoor unit 1, to the indoor units 2.

As illustrated in FIGS. 1 and 2, in the air-conditioning apparatus according to the Embodiment, the outdoor unit 1 is connected to the relay unit 3 using two refrigerant pipes 4 and the relay unit 3 is connected to each indoor unit 2 using two pipes 5. As described above, in the air-conditioning apparatus according to the Embodiment, each unit (outdoor unit 1, indoor unit 2, and relay unit 3) is connected using two pipes (the refrigerant pipes 4 or the pipes 5), thus facilitating construction.

As illustrated in FIG. 2, the relay unit 3 can be separated into a main relay unit 3a and two sub relay units 3b (a sub relay unit 3b(1), a sub relay unit 3b(2)) derived from the main relay unit 3a, This separation allows a plurality of sub relay units 3b to be connected to a main relay unit 3a. In this configuration, the number of refrigerant pipes 4 connecting the main relay unit 3a to each sub relay unit 3b is three. Such a circuit will be described in detail later (refer to FIG. 3A).

It should be noted that FIGS. 1 and 2 illustrate a state in which the relay unit 3 is disposed in a space different from the indoor space 7 such as a space above a ceiling (hereinafter, simply referred to as "space 8") inside the structure 9. The relay unit 3 can be placed in other spaces, e.g., a common space where an elevator is installed. Furthermore, although FIGS. 1 and 2 illustrate a case in which the indoor units 2 are of a ceiling-mounted cassette type, the indoor units are not limited to this type and, for example, a ceiling-concealed type, a ceiling-suspended type, or any indoor unit may be used as long as the unit can blow out heating air or cooling air into the indoor space 7 directly or through a duct or the like.

FIGS. 1 and 2 illustrate a case in which the outdoor unit 1 is disposed in the outdoor space 6. The arrangement is not limited to this case. For example, the outdoor unit 1 may be disposed in an enclosed space with a ventilation opening, for example, a machine room, and may be disposed inside the structure 9 as long as waste heat can be exhausted through an exhaust duct to the outside of the structure 9, or may be disposed inside the structure 9 when using an outdoor unit 1 of a water-cooled type. Even when the outdoor unit 1 is disposed in such a place, no problems in particular will occur.

Furthermore, the relay unit 3 can be disposed near the outdoor unit 1. If the distance between the relay unit 3 and each indoor unit 2 is too far, the conveyance power for the heat medium will be considerably large. It should therefore be noted that the energy saving effect will be reduced in this case. Furthermore, the connected numbers of the outdoor unit 1, indoor unit 2, and the relay unit 3 are not limited to the numbers illustrated in FIGS. 1 and 2. The numbers may be determined depending on the structure 9 in which the air-conditioning apparatus according to the Embodiment is installed.

Figure 3:
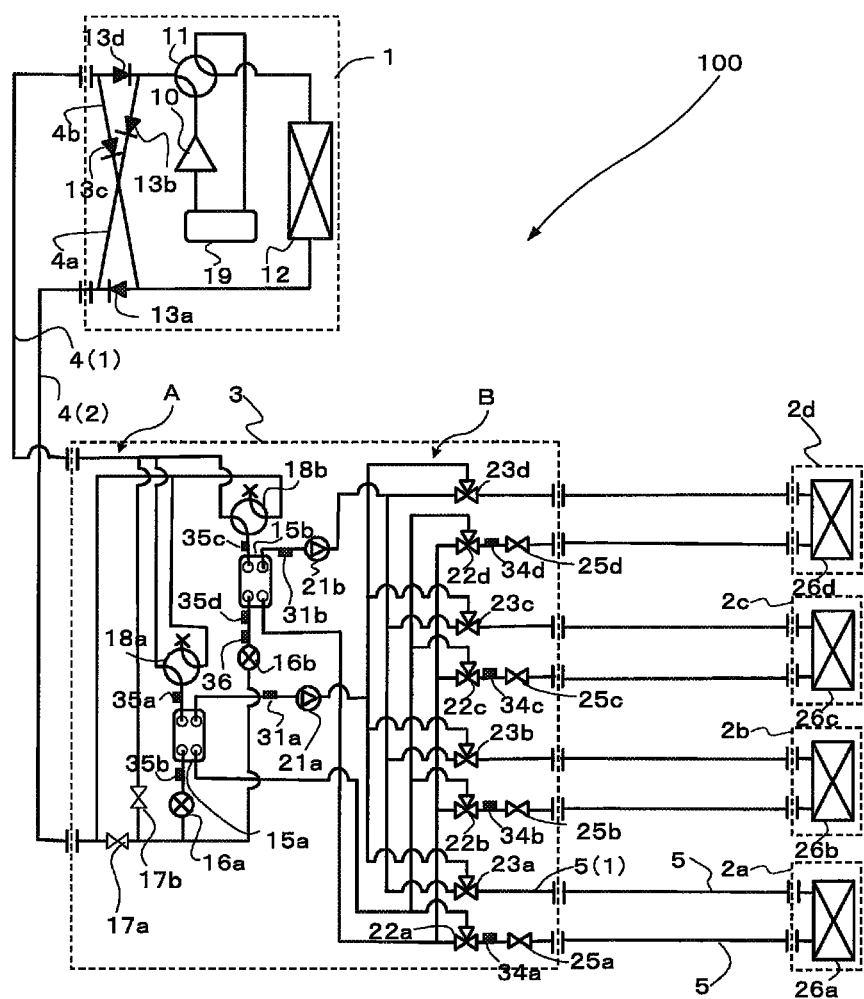
FIG. 3 is a schematic circuit diagram illustrating a circuit configuration of the air-conditioning apparatus according to the Embodiment of the invention.

FIG. 3 is a schematic circuit diagram illustrating an exemplary circuit configuration of the air-conditioning apparatus (hereinafter, referred to as "air-conditioning apparatus 100") according to the Embodiment. The detailed configuration of the air-conditioning apparatus 100 will be described with reference to FIG. 3. Referring to FIG. 3, the outdoor unit 1 and the relay unit 3 are interconnected with the refrigerant pipes 4 via a heat exchanger related to heat medium 15a and a heat exchanger related to heat medium 15b provided in the relay unit 3. Furthermore, the relay unit 3 and the indoor units 2 are interconnected with the pipes 5 via the heat exchanger related to heat medium 15a and the heat exchanger related to heat medium 15b.

[Outdoor Unit 1]

The outdoor unit 1 includes a compressor 10, a first refrigerant flow switching device 11, such as a four-way valve, a heat source side heat exchanger 12, and an accumulator 19 which are connected in series through the refrigerant pipe 4. The outdoor unit 1 further includes a first connecting pipe 4a, a second connecting pipe 4b, a check valve 13a, a check valve 13b, a check valve 13c, and a check valve 13d. Such arrangement of the first connecting pipe 4a, the second connecting pipe 4b, the check valve 13a, the check valve 13b, the check valve 13c, and the check valve 13d allows the heat-source-side refrigerant, allowed to flow into the relay unit 3, to flow in a constant direction irrespective of the operations requested by the indoor units 2.

The compressor 10 sucks the heat-source-side refrigerant and compresses the heat-source-side refrigerant to a high-temperature high-pressure state, and may be an inverter type variable capacity compressor, for example. The first refrigerant flow switching device 11 is configured to switch between a refrigerant flow on the heat-source-side for a heating operation (including a heating only operation mode and a heating-main operation mode) and a refrigerant flow on the heat-source-side for a cooling operation (including a cooling only operation mode and a cooling-main operation mode). The heat source side heat exchanger 12 is configured to function as an evaporator when in the heating operation, function as a condenser (or a radiator) when in the cooling operation, exchange heat between air supplied from an air-blowing device, such as a fan, (not illustrated) and the heat-source-side refrigerant, and evaporate and gasify the heat-source-side refrigerant or condense and liquefy the same. The accumulator 19 is disposed on a suction side of the compressor 10 and is configured to store excess refrigerant.

The check valve 13d is provided in the refrigerant pipe 4 between the relay unit 3 and the first refrigerant flow switching device 11 and is configured to allow the heat-source-side refrigerant to flow only in a predetermined direction (the direction from the relay unit 3 to the outdoor unit 1). The check valve 13a is provided in the refrigerant pipe 4 between the heat source side heat exchanger 12 and the relay unit 3 and is configured to allow the heat-source-side refrigerant to flow only in a predetermined direction (the direction from the outdoor unit 1 to the relay unit 3). The check valve 13b is provided in the first connecting pipe 4a and is configured to allow the heat-source-side refrigerant, discharged from the compressor 10 during the heating operation, to flow through the relay unit 3. The check valve 13c is provided in the second connecting pipe 4b and is configured to allow the heat-source-side refrigerant, returned from the relay unit 3 during the heating operation, to flow to the suction side of the compressor 10.

The first connecting pipe 4a, in the outdoor unit 1, is configured to connect the refrigerant pipe 4 between the first refrigerant flow switching device 11 and the check valve 13d to the refrigerant pipe 4 between the check valve 13a and the relay unit 3. The second connecting pipe 4b, in the outdoor unit 1, is configured to connect the refrigerant pipe 4 between the check valve 13d and the relay unit 3 to the refrigerant pipe 4 between the heat source side heat exchanger 12 and the check valve 13a. It should be noted that although FIG. 3 illustrates a case in which the first connecting pipe 4a, the second connecting pipe 4b, the check valve 13a, the check valve 13b, the check valve 13c, and the check valve 13d are arranged, the arrangement is not limited to this case. It is not always essential to provide these components.

[Indoor Units 2]

The indoor units 2 each include a use side heat exchanger 26. This use side heat exchanger 26 is connected to a heat medium flow rate control device 25 and a second heat medium flow switching device 23 in the relay unit 3 through the pipes 5. This use side heat exchanger 26 is configured to exchange heat between air supplied from an air-blowing device, such as a fan, (not illustrated) and the heat medium to produce heating air or cooling air to be supplied to the indoor space 7.

FIG. 3 illustrates a case in which four indoor units 2 are connected to the relay unit 3. Illustrated, from the bottom of the drawing sheet, are an indoor unit 2a, an indoor unit 2b, an indoor unit 2c, and an indoor unit 2d. Furthermore, corresponding to the indoor units 2a to 2d, the use side heat exchangers 26 are illustrated, from the bottom of the drawing sheet, as a use side heat exchanger 26a, a use side heat exchanger 26b, a use side heat exchanger 26c, and a use side heat exchanger 26d. Note that, in the same manner as in FIGS. 1 and 2, the number of indoor units 2 connected is not limited to four as illustrated in FIG. 3.

[Relay Unit 3]

The relay unit 3 includes the two heat exchangers related to heat medium 15, two expansion devices 16, two opening and closing devices 17, two second refrigerant flow switching devices 18, two pumps 21, four first heat medium flow switching devices 22, the four second heat medium flow switching devices 23, and the four heat medium flow rate control devices 25. Furthermore, a configuration in which the relay unit 3 is separated into the main relay unit 3a and the sub relay unit 3b will be described later with reference to FIG. 3A.

Each of the two heat exchangers related to heat medium 15 (the heat exchanger related to heat medium 15a, the heat exchanger related to heat medium 15b) is configured to function as a condenser (radiator) or an evaporator and to exchange heat between the heat-source-side refrigerant and the heat medium and transfer cooling energy or heating energy, generated by the outdoor unit 1 and stored in the heat-source-side refrigerant, to the heat medium. The heat exchanger related to heat medium 15a is disposed between the expansion device 16a and the second refrigerant flow switching device 18a in a refrigerant circuit A and is used to heat the heat medium in the heating only operation mode and is used to cool the heat medium in the cooling only operation mode, the cooling-main operation mode, and the heating-main operation mode. Furthermore, the heat exchanger related to heat medium 15b is disposed between the expansion device 16b and the second refrigerant flow switching device 18b in the refrigerant circuit A and is used to heat the heat medium in the heating only operation mode, the cooling-main operation mode, and the heating-main operation mode and is used to cool the heat medium in the cooling only operation mode.

The two expansion devices 16 (expansion device 16a, expansion device 16b) each have functions of a reducing valve and an expansion valve and are configured to reduce the pressure of the heat-source-side refrigerant and expand the same. The expansion device 16a is disposed upstream of the heat exchanger related to heat medium 15a in the flow direction of the heat-source-side refrigerant during the cooling operation. The expansion device 16b is disposed upstream of the heat exchanger related to heat medium 15b in the flow direction of the heat-source-side refrigerant during the cooling operation. The two expansion devices 16 may be constituted by a component having a variably controllable opening-degree, e.g., an electronic expansion valve.

Each of the two opening and closing devices 17 (opening and closing device 17a, opening and closing device 17b) is constituted by, for example, a two-way valve and is configured to open and close the refrigerant pipes 4. The opening and closing device 17a is provided in the refrigerant pipe 4 on an inlet side of the heat-source-side refrigerant. The opening and closing device 17b is provided in a pipe connecting the refrigerant pipes 4 on the inlet side and the outlet side of the heat-source-side refrigerant. Each of the two second refrigerant flow switching devices 18 (second refrigerant flow switching device 18a, second refrigerant flow switching device 18b) is constituted by, for example, a four-way valve and is configured to switch the flow direction of the heat-source-side refrigerant in accordance with an operation mode. The second refrigerant flow switching device 18a is disposed downstream of the heat exchanger related to heat medium 15a in the flow direction of the heat-source-side refrigerant during the cooling operation. The second refrigerant flow switching device 18b is disposed downstream of the heat exchanger related to heat medium 15b in the flow direction of the heat-source-side refrigerant during a cooling only operation.

The two pumps 21 (pump 21a, pump 21b) are configured to circulate the heat medium flowing through the pipe 5. The pump 21a is provided in the pipe 5 disposed between the heat exchanger related to heat medium 15a and each of the second heat medium flow switching devices 23. The pump 21b is provided in the pipe 5 disposed between the heat exchanger related to heat medium 15b and each of the second heat medium flow switching devices 23. Each of the two pumps 21 may be constituted by, for example, a capacity-controllable pump. Furthermore, the pump 21a may be provided in the pipe 5 disposed between the heat exchanger related to heat medium 15a and each of the first heat medium flow switching devices 22. Furthermore, the pump 21b may be provided in the pipe 5 disposed between the heat exchanger related to heat medium 15b and each of the first heat medium flow switching devices 22.

Each of the four first heat medium flow switching devices 22 (first heat medium flow switching devices 22a to 22d) is constituted by, for example, a three-way valve and is configured to switch the flow paths of the heat medium. The first heat medium flow switching devices 22 are arranged so that their number (four in this case) corresponds to the number of indoor units 2 installed. Each first heat medium flow switching device 22 is disposed in a corresponding flow path of the heat medium on the outlet side of a use side heat exchanger 26. Out of the three ways, one is connected to the heat exchanger related to heat medium 15a, another one is connected to the heat exchanger related to heat medium 15b, and the other one is connected to the heat medium flow rate control device 25. Furthermore, corresponding to the indoor units 2 and illustrated from the bottom of the drawing sheet are the first heat medium flow switching device 22a, the first heat medium flow switching device 22b, the first heat medium flow switching device 22c, and the first heat medium flow switching device 22d.

Each of the four second heat medium flow switching devices 23 (second heat medium flow switching devices 23a to 23d) is constituted by, for example, a three-way valve and is configured to switch the flow paths of the heat medium. The second heat medium flow switching devices 23 are arranged so that their number (four in this case) corresponds to the number of indoor units 2 installed. The second heat medium flow switching devices 23 are arranged so that their number (four in this case) corresponds to the number of indoor units 2 installed. Each first heat medium flow switching device 23 is disposed in a corresponding flow path of the heat medium on the inlet side of a use side heat exchanger 26. Out of the three ways, one is connected to the heat exchanger related to heat medium 15a, another one is connected to the heat exchanger related to heat medium 15b, and the other one is connected to the heat medium flow rate control device 26. Furthermore, corresponding to the indoor units 2 and illustrated from the bottom of the drawing sheet are the second heat medium flow switching device 23a, the second heat medium flow switching device 23b, the second heat medium flow switching device 23c, and the second heat medium flow switching device 23d.

Each of the four heat medium flow rate control devices 25 (heat medium flow rate control devices 25a to 25d) is constituted by, for example, a two-way valve using a stepping motor and is configured to permit the opening-degree of the pipe 5, serving as a heat medium flow path, to be changed and control the flow rate of the heat medium. The heat medium flow rate control devices 25 are arranged so that their number (four in this case) corresponds to the number of indoor units 2 installed. Each heat medium flow rate control device 25 is disposed in a corresponding flow path of the heat medium on the outlet side of a use side heat exchanger 26 and one way thereof is connected to the use side heat exchanger 26 and the other way is connected to the first heat medium flow switching device 22. Furthermore, corresponding to the indoor units 2 and illustrated from the bottom of the drawing sheet are the heat medium flow rate control device 25a, the heat medium flow rate control device 25b, the heat medium flow rate control device 25c, and the heat medium flow rate control device 25d.

It should be noted that the Embodiment will be described with respect to a case in which each heat medium flow rate control device 25 is disposed on the outlet side (downstream side) of the corresponding use side heat exchanger 26. The arrangement is not limited to this case. Each heat medium flow rate control device 25 may be disposed on the inlet side (upstream side) of the use side heat exchanger 26 such that one way is connected to the use side heat exchanger 26 and the other way is connected to the second heat medium flow switching device 23.

The relay unit 3 further includes various detecting means (two first temperature sensors 31, four second temperature sensors 34, four third temperature sensors 35, and a pressure sensor 36). Information (temperature information, pressure information) detected by these detecting means are transmitted to a controller (not illustrated) that performs centralized control of an operation of the air-conditioning apparatus 100, and are used to control, for example, the driving frequency of the compressor 10, the rotation speed of the fan (not illustrated), switching of the first refrigerant flow switching device 11, the driving frequency of the pumps 21, switching of the second refrigerant flow switching devices 18, and switching the flow paths of the heat medium.

Each of the two first temperature sensors 31 (first temperature sensor 31a, first temperature sensor 31b) is configured to detect the temperature of the heat medium flowing out of the heat exchanger related to heat medium 15, that is, the temperature of the heat medium at an outlet of the heat exchanger related to heat medium 15 and may be constituted by, for example, a thermistor. The first temperature sensor 31a is provided in the pipe 5 on an inlet side of the pump 21a. The first temperature sensor 31b is provided in the pipe 5 on an inlet side of the pump 21b.

Each of the four second temperature sensors 34 (second temperature sensors 34a to 34d) is disposed between the first heat medium flow switching device 22 and the heat medium flow rate control device 25 and is configured to detect the temperature of the heat medium flowing out of the use side heat exchanger 26 and may be constituted by, for example, a thermistor. The second temperature sensors 34 are arranged so that their number (four in this case) corresponds to the number of indoor units 2 installed. Furthermore, corresponding to the indoor units 2 and illustrated from the bottom of the drawing sheet are the second temperature sensor 34a, the second temperature sensor 34b, the second temperature sensor 34c, and the second temperature sensor 34d.

Each of the four third temperature sensors 35 (third temperature sensors 35a to 35d) is disposed on a heat-source-side refrigerant inlet side or outlet side of the heat exchanger related to heat medium 15 and is configured to detect the temperature of the heat-source-side refrigerant flowing into the heat exchanger related to heat medium 15, or the temperature of the heat-source-side refrigerant flowing out of the heat exchanger related to heat medium 15 and may be constituted by, for example, a thermistor. The third temperature sensor 35a is disposed between the heat exchanger related to heat medium 15a and the second refrigerant flow switching device 18a. The third temperature sensor 35b is disposed between the heat exchanger related to heat medium 15a and the expansion device 16a. The third temperature sensor 35c is disposed between the heat exchanger related to heat medium 15b and the second refrigerant flow switching device 18b. The third temperature sensor 35d is disposed between the heat exchanger related to heat medium 15b and the expansion device 16b.

The pressure sensor 36 is disposed between the heat exchanger related to heat medium 15b and the expansion device 16b, similar to the installation position of the third temperature sensor 35d, and is configured to detect the pressure of the heat-source-side refrigerant flowing between the heat exchanger related to heat medium 15b and the expansion device 16b.

Furthermore, the controller (not illustrated) is constituted by, for example, a microcomputer and controls, for example, the driving frequency of the compressor 10, the rotation speed (including ON/OFF) of the fan, switching of the first refrigerant flow switching device 11, driving the pumps 21, the opening-degree of each expansion device 16, the opening-degree of each opening and closing device 17, switching of the second refrigerant flow switching devices 18, switching of the first heat medium flow switching devices 22, switching of the second heat medium flow switching devices 23, and running the heat medium flow rate control devices 25 on the basis of the information detected by the various detecting means and an instruction from a remote-controlling device to carry out any one of the operation modes which will be described later. Note that the controller may be provided in each unit or may be provided in the outdoor unit 1 or the relay unit 3.

The pipes 5 for conveying the heat medium is constituted by the pipe connected to the heat exchanger related to heat medium 15a and the pipe connected to the heat exchanger related to heat medium 15b. Each pipe 5 is branched (into four in this case) in accordance with the number of indoor units 2 connected to the relay unit 3. The pipes 5 are connected through the first heat medium flow switching devices 22 and the second heat medium flow switching devices 23. Control of the first heat medium flow switching devices 22 and the second heat medium flow switching devices 23 determines whether the heat medium flowing from the heat exchanger related to heat medium 15a is allowed to flow into the use side heat exchanger 26 and whether the heat medium flowing from the heat exchanger related to heat medium 15b is allowed to flow into the use side heat exchanger 26.

In the air-conditioning apparatus 100, the compressor 10, the first refrigerant flow switching device 11, the heat source side heat exchanger 12, the opening and closing devices 17, the second refrigerant flow switching devices 18, a refrigerant flow path of the heat exchanger related to heat medium 15a, the expansion devices 16, and the accumulator 19 are connected though the refrigerant pipes 4, thus forming the refrigerant circuit A. Furthermore, a heat medium flow path of the heat exchanger related to heat medium 15a, the pumps 21, the first heat medium flow switching devices 22, the heat medium flow rate control devices 25, the use side heat exchangers 26, and the second heat medium flow switching devices 23 are connected through the pipes 5, thus forming a heat medium circuit B. In other words, the plurality of use side heat exchangers 26 are connected in parallel to each of the heat exchangers related to heat medium 15, thus turning the heat medium circuit B into a multi-system.

Accordingly, in the air-conditioning apparatus 100, the outdoor unit 1 and the relay unit 3 are connected through the heat exchanger related to heat medium 15a and the heat exchanger related to heat medium 15b arranged in the relay unit 3. The relay unit 3 and each indoor unit 2 are connected through the heat exchanger related to heat medium 15a and the heat exchanger related to heat medium 15b. In other words, in the air-conditioning apparatus 100, the heat-source-side refrigerant circulating in the refrigerant circuit A and the heat medium circulating in the heat medium circuit B exchanges heat at the heat exchanger related to heat medium 15a and the heat exchanger related to heat medium 15b.

With respect to the heat medium, a single-phase liquid that does not change between two phases, gas and liquid, during circulation in the heat medium circuit B is used. For example, water or antifreeze is used.

Figure 3A:
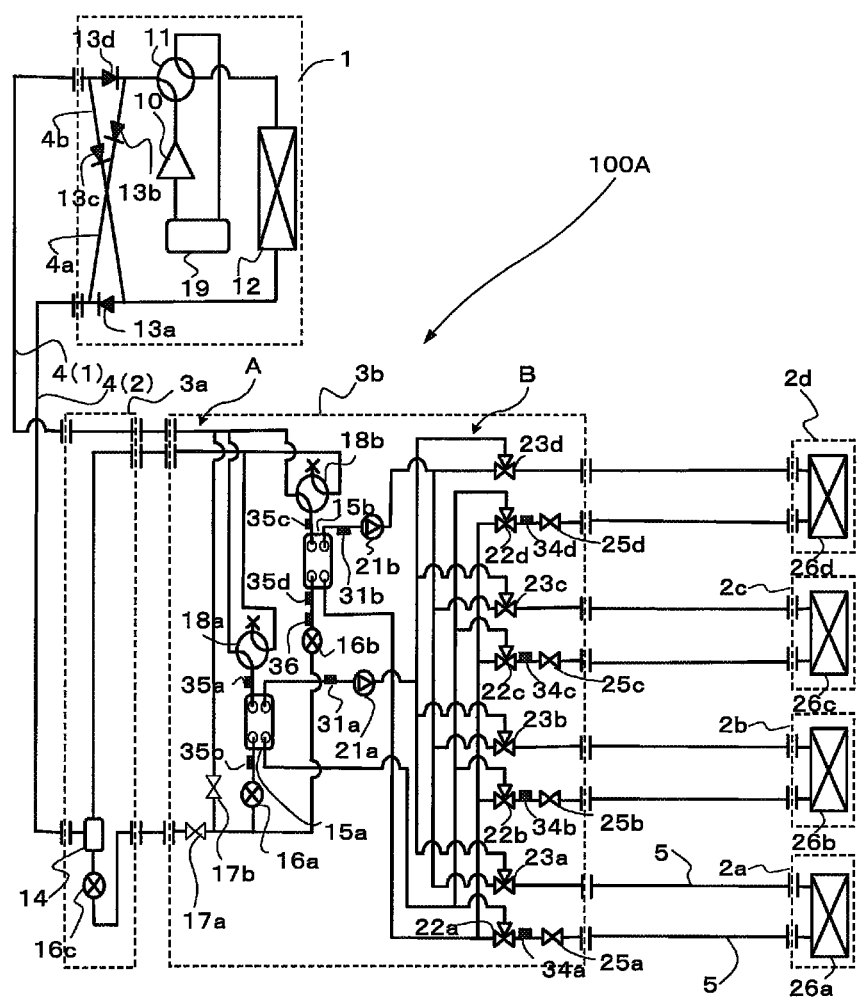
FIG. 3A is a schematic circuit diagram illustrating another circuit configuration of the air-conditioning apparatus according to the Embodiment of the invention.

FIG. 3A is a schematic circuit diagram illustrating another exemplary circuit configuration of an air-conditioning apparatus (hereinafter, referred to as an "air-conditioning apparatus 100A") according to the Embodiment. A circuit configuration of the air-conditioning apparatus 100A in the case in which a relay unit 3 is separated into a main relay unit 3a and a sub relay unit 3b will be described with reference to FIG. 3A. Referring to FIG. 3A, the relay unit 3 is separated into a housed main relay unit 3a and a housed sub relay unit 3b. This separation allows a plurality of sub relay units 3b to be connected to one main relay unit 3a as illustrated in FIG. 2.

The main relay unit 3a includes a gas-liquid separator 14 and an expansion device 16c. The other components are arranged in the sub relay unit 3b. The gas-liquid separator 14 is connected to a refrigerant pipe 4 connected to an outdoor unit 1 and is connected to two refrigerant pipes 4 connected to a heat exchanger related to heat medium 15a and a heat exchanger related to heat medium 15b in the sub relay unit 3b, and is configured to separate the heat-source-side refrigerant supplied from the outdoor unit 1 into a vapor refrigerant and a liquid refrigerant. The expansion device 16c may be constituted by a component having a variably controllable opening-degree, e.g., an electronic expansion valve and, during a cooling and heating mixed operation, is controlled such that the pressure condition of the refrigerant on an outlet side of the expansion device 16c is at medium pressure. This arrangement allows a plurality of sub relay units 3b to be connected to the main relay unit 3a.

The operation modes carried out by the air-conditioning apparatus 100 will be described. The air-conditioning apparatus 100 can perform cooling operation or heating operation on the basis of instructions from the indoor units 2. That is, the air-conditioning apparatus 100 can have all of the indoor units 2 perform the same operation and also have the indoor units 2 perform different operations. The same applies to operation modes carried out by the air-conditioning apparatus 100A. Accordingly, description of the operation modes carried out by the air-conditioning apparatus 100A is omitted.

The operation modes carried out by the air-conditioning apparatus 100 includes the cooling only operation mode in which all of the running indoor units 2 perform the cooling operation, the heating only operation mode in which all of the running indoor units 2 perform the heating operation, the cooling-main operation mode in which a cooling load is larger, and the heating-main operation mode in which a heating load is larger. Each operation mode will be described below with respect to the flow of the heat-source-side refrigerant and that of the heat medium.

[Cooling Only Operation Mode]

Figure 4:
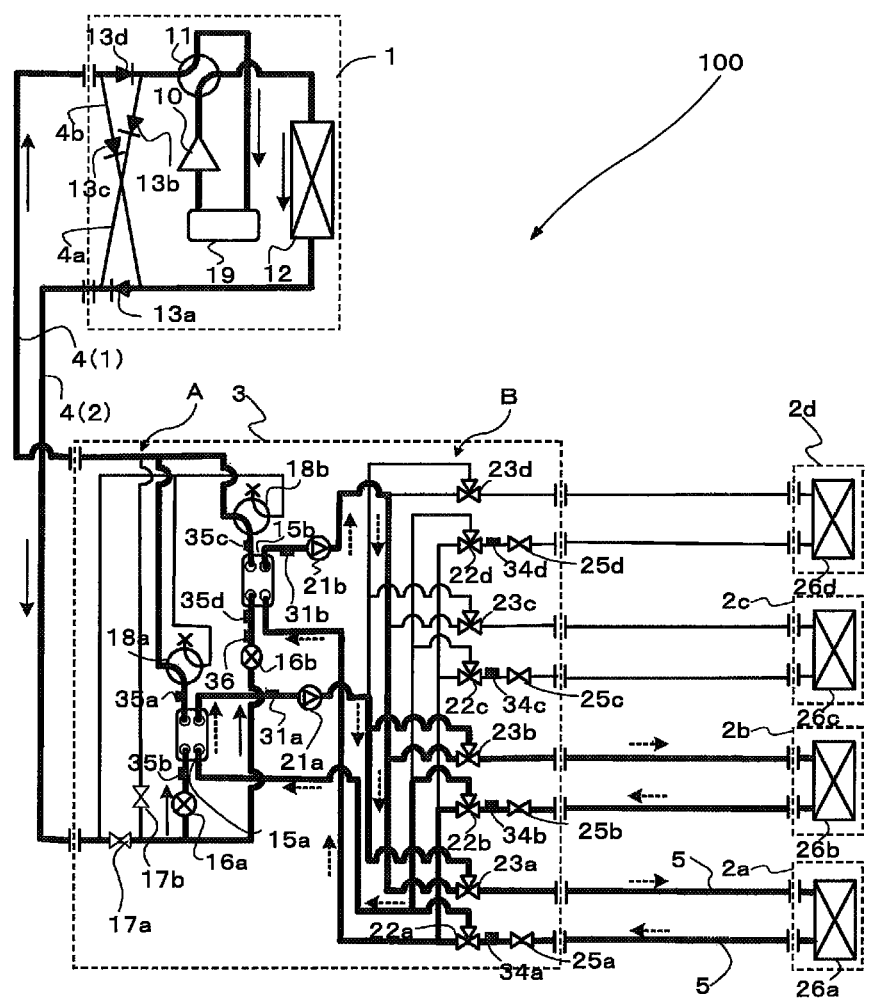
FIG. 4 is a refrigerant circuit diagram illustrating flows of refrigerants in a cooling only operation mode of the air-conditioning apparatus according to the Embodiment of the invention.

FIG. 4 is a refrigerant circuit diagram illustrating the flow of the refrigerant in the cooling only operation mode of the air-conditioning apparatus 100. The cooling only operation mode will be described with respect to a case in which a cooling load occurs only in the use side heat exchanger 26a and the use side heat exchanger 26b in FIG. 4. Furthermore, in FIG. 4, pipes indicated by thick lines correspond to pipes through which the refrigerants (the heat-source-side refrigerant and the heat medium) flow. Furthermore, the direction of flow of the heat-source-side refrigerant is indicated by solid-line arrows and the direction of flow of the heat medium is indicated by broken-line arrows in FIG. 4.

In the cooling only operation mode illustrated in FIG. 4, the first refrigerant flow switching device 11 in the outdoor unit 1 is switched so that the heat-source-side refrigerant discharged from the compressor 10 flows into the heat source side heat exchanger 12. In the relay unit 3, the pump 21a and the pump 21b are run, the heat medium flow rate control device 25a and the heat medium flow rate control device 25b are opened, and the heat medium flow rate control device 25c and the heat medium flow rate control device 25c are closed such that the heat medium circulates between each of the heat medium heat exchanger 15a and the heat medium heat exchanger 15b and each of the use side heat exchanger 26a and the use side heat exchanger 26b.

First, the flow of the heat-source-side refrigerant in the refrigerant circuit A will be first described, A low-temperature low-pressure refrigerant is compressed by the compressor 10 and is discharged as a high-temperature high-pressure gas refrigerant therefrom. The high-temperature high-pressure gas refrigerant discharged from the compressor 10 passes through the first refrigerant flow switching device 11 and flows into the heat source side heat exchanger 12. Then, the refrigerant condenses and liquefies into a high-pressure liquid refrigerant while transferring heat to outdoor air in the heat source side heat exchanger 12. The high-pressure liquid refrigerant flowing out of the heat source side heat exchanger 12 passes through the check valve 13a, flows out of the outdoor unit 1, passes through the refrigerant pipe 4, and flows into the relay unit 3. The high-pressure liquid refrigerant flowing into the relay unit 3 is branched after passing through the opening and closing device 17a and is then expanded into a low-temperature low-pressure two-phase refrigerant by the expansion device 16a and expansion device 16b.

This two-phase refrigerant flows into each of the heat exchanger related to heat medium 15a and the heat exchanger related to heat medium 15b, functioning as evaporators, takes heat away from the heat medium circulating in the heat medium circuit B to cool the heat medium, and turns into a low-temperature low-pressure gas refrigerant. The gas refrigerant, which has flowed out of each of the heat exchanger related to heat medium 15a and the heat exchanger related to heat medium 15b, flows out of the relay unit 3 through the second refrigerant flow switching device 18a and the second refrigerant flow switching device 18b, passes through the refrigerant pipe 4, and again flows into the outdoor unit 1. The refrigerant flowing into the outdoor unit 1 passes through the check valve 13d, and is again sucked into the compressor 10 via the first refrigerant flow switching device 11 and the accumulator 19.

At this time, the opening-degree of the expansion device 16a is controlled such that superheat (the degree of superheat), which is determined by the difference between a temperature detected by the third temperature sensor 35a and by the third temperature sensor 35b, is constant. Similarly, the opening-degree of the expansion device 16b is controlled such that superheat, which is determined by the difference between a temperature detected by the third temperature sensor 35c and by the third temperature sensor 35d, is constant. Furthermore, the opening and closing device 17a is opened and the opening and closing device 17b is closed.

Next, the flow of the heat medium in the heat medium circuit B will be described.

In the cooling only operation mode, both of the heat exchanger related to heat medium 15a and heat exchanger related to heat medium 15b transfer cooling energy of the heat-source-side refrigerant to the heat medium, and the cooled heat medium is made to flow in the pipes 5 by the pump 21a and pump 21b. The heat medium, which has flowed out of the pump 21a and the pump 21b while being pressurized, flows through into the use side heat exchanger 26a and the use side heat exchanger 26b via the second heat medium flow switching device 23a and the second heat medium flow switching device 23b. The heat medium takes heat away from the indoor air in each of the use side heat exchanger 26a and the use side heat exchanger 26b, thus cooling the indoor space 7.

The heat medium then flows out of each of the use side heat exchanger 26a and the use side heat exchanger 26b and flows into the heat medium flow rate control device 25a and the heat medium flow rate control device 25b. At this time, with the effect of the heat medium flow rate control device 25a and the heat medium flaw rate control device 25b, the flow rates of the heat medium flowing into the use side heat exchanger 26a and the use side heat exchanger 26b are controlled to flow rates necessary to cover an air-conditioning load required in the indoor space. The heat medium, which has flowed out of the heat medium flow rate control device 25a and the heat medium flow rate control device 25b, passes through the corresponding first heat medium flow switching device 22a and the first heat medium flow switching device 22b, flows into the heat exchanger related to heat medium 15a and the heat exchanger related to heat medium 15b, and is then again sucked into the corresponding pump 21a and pump 21b.

Note that in the pipes 5 in each use side heat exchanger 26, the heat medium flows in a direction from the second heat medium flow switching device 23 through the heat medium flow rate control device 25 to the first heat medium flow switching device 22. Furthermore, the air-conditioning load required in the indoor space 7 can be covered by controlling the heat medium flow rate control device 25 so that the difference between a temperature detected by the first temperature sensor 31a or that detected by the first temperature sensor 31b and a temperature detected by the second temperature sensor 34 to be kept to a target value. As regards a temperature at the outlet of each heat exchanger related to heat medium 15, either of the temperature detected by the first temperature sensor 31a and that by the first temperature sensor 31b may be used or the mean temperature of them may be used. At this time, the opening-degree of each of the first heat medium flow switching devices 22 and the second heat medium flow switching devices 23 is set to a medium degree such that flow paths to both of the heat exchanger related to heat medium 15a and the heat exchanger related to heat medium 15b are maintained.

Upon carrying out the cooling only operation mode, since it is unnecessary to supply the heat medium to a use side heat exchanger 26 having no air-conditioning load (including thereto-off), the flow path is closed by the corresponding heat medium flow rate control device 25 such that the heat medium does not flow into the use side heat exchanger 26. In FIG. 4, the heat medium flows into the use side heat exchanger 26a and the use side heat exchanger 26b because these use side heat exchangers have an air-conditioning load. On the other hand, the use side heat exchanger 26c and the use side heat exchanger 26d have no air-conditioning load and the corresponding heat medium flow rate control devices 25c and 25d are fully closed. When a heating load occurs in the use side heat exchanger 26c or the use side heat exchanger 26d, the heat medium flow rate control device 25c or the heat medium flow rate control device 25d may be opened such that the heat medium is circulated.

[Heating Only Operation Mode]

Figure 5:
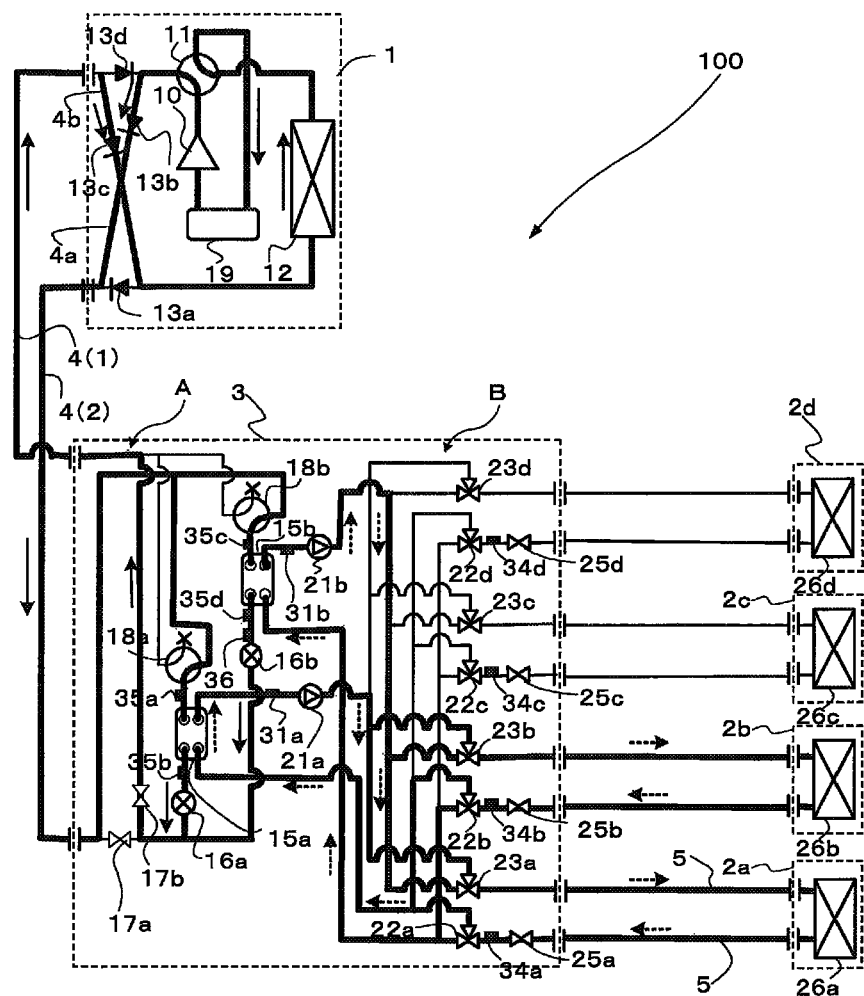
FIG. 5 is a refrigerant circuit diagram illustrating flows of the refrigerants in a heating only operation mode of the air-conditioning apparatus according to the Embodiment of the invention.

FIG. 5 is a refrigerant circuit diagram illustrating the flows of the refrigerants in the heating only operation mode in the air-conditioning apparatus 100. The heating only operation mode will be described with respect to a case in which a heating load occurs only in the use side heat exchanger 26a and the use side heat exchanger 26b in FIG. 5. Furthermore, in FIG. 5, pipes indicated by thick lines correspond to pipes through which the refrigerants (the heat-source-side refrigerant and the heat medium) flow. Furthermore, the direction of flow of the heat-source-side refrigerant is indicated by solid-line arrows and the direction of flow of the heat medium is indicated by broken-line arrows in FIG. 5.

In the heating only operation mode illustrated in FIG. 5, the first refrigerant flow switching device 11 in the outdoor unit 1 is switched so that the heat-source-side refrigerant discharged from the compressor 10 flows into the relay unit without passing through the heat source side heat exchanger 12. In the relay unit 3, the pump 21a and the pump 21b are run, the heat medium flow rate control device 25a and the heat medium flow rate control device 25b are opened, and the heat medium flow rate control device 25c and the heat medium flow rate control device 25c are closed such that the heat medium circulates between each of the heat medium heat exchanger 15a and the heat medium heat exchanger 15b and each of the use side heat exchanger 26a and the use side heat exchanger 26b.

First, the flow of he heat-source-side refrigerant in the refrigerant circuit A will be described.

A low-temperature low-pressure refrigerant is compressed by the compressor 10 and is discharged as a high-temperature high-pressure gas refrigerant therefrom. The high-temperature high-pressure gas refrigerant discharged from the compressor 10 passes through the first refrigerant flow switching device 11, flows through the first connecting pipe 4a, passes through the check valve 13b, and flows out of the outdoor unit 1. The high-temperature high-pressure gas refrigerant, which has flowed out of the outdoor unit 1, passes through the refrigerant pipe 4 and flows into the relay unit 3. The high-temperature high-pressure gas refrigerant flowing into the relay unit 3 is branched. The refrigerant passes through each of the second refrigerant flow switching device 18a and the second refrigerant flow switching device 18b and flows into the corresponding heat exchanger related to heat medium 15a and heat exchanger related to heat medium 15b.

The high-temperature high-pressure gas refrigerant flowing into each of the heat exchanger related to heat medium 15a and the heat exchanger related to heat medium 15b condenses and liquefies into a high-pressure liquid refrigerant while transferring heat to the heat medium circulating in the heat medium circuit B. The liquid refrigerant, which has flowed out of the heat exchanger related to heat medium 15a and the heat exchanger related to heat medium 15b, is expanded into a low-temperature low-pressure two-phase refrigerant by the corresponding expansion device 16a and the expansion device 16b. This two-phase refrigerant passes through the opening and closing device 17b, flows out of the relay unit 3, and again flows into the outdoor unit 1 through the refrigerant pipe 4. The refrigerant flowing into the outdoor unit 1 flows through the second connecting pipe 4b, passes through the check valve 13c, and flows into the heat source side heat exchanger 12, functioning as an evaporator.

The refrigerant flowing into the heat source side heat exchanger 12 then takes heat away from the outdoor air in the heat source side heat exchanger 12 and turns into a low-temperature low-pressure gas refrigerant. The low-temperature low-pressure gas refrigerant flowing out of the heat source side heat exchanger 12 passes through the first refrigerant flow switching device 11 and the accumulator 19 and is again sucked into the compressor 10.

At this time, the opening-degree of the expansion device 16a is controlled such that subcool (the degree of subcooling), which is determined by the difference between a saturation temperature converted from a pressure detected by the pressure sensor 36 and a temperature detected by the third temperature sensor 35b, is constant. Similarly, the opening-degree of the expansion device 16b is controlled such that subcool, which is determined by the difference between the value indicating the saturation temperature converted from the pressure detected by the pressure sensor 36 and a temperature detected by the third temperature sensor 35d, is constant. Furthermore, the opening and closing device 17a is closed and the opening and closing device 17b is opened. Also, in the case in which a temperature in the middle of the heat exchangers related to heat medium 15 can be measured, the temperature in the middle may be used instead of the pressure sensor 36. Thus, an inexpensive system can be constructed, Next, the flow of the heat medium in the heat medium circuit B will be described.

In the warming only operation mode, both of the heat exchanger related to heat medium 15a and heat exchanger related to heat medium 15b transfer heating energy of the heat-source-side refrigerant to the heat medium, and the heated heat medium is made to flow in the pipes 5 by the pump 21a and pump 21b. The heat medium, which has flowed out of the pump 21a and the pump 21b while being pressurized, flows through into the use side heat exchanger 26a and the use side heat exchanger 26b via the second heat medium flow switching device 23a and the second heat medium flow switching device 23b. The heat medium transfers heat from the indoor air in each of the use side heat exchanger 26a and the use side heat exchanger 26b, thus heating the indoor space 7.

The heat medium then flows out of each of the use side heat exchanger 26a and the use side heat exchanger 26b and flows into the heat medium flow rate control device 25a and the heat medium flow rate control device 25b. At this time, with the effect of the heat medium flow rate control device 25a and the heat medium flow rate control device 25b, the flow rate of the heat medium flowing into the use side heat exchanger 26a and the use side heat exchanger 26b is controlled to a flow rate necessary to cover an air-conditioning load required in the indoor space. The heat medium, which has flowed out of the heat medium flow rate control device 25a and the heat medium flow rate control device 25b, passes through the corresponding first heat medium flow switching device 22a and the first heat medium flow switching device 22b, flows into the heat exchanger related to heat medium 15a and the heat exchanger related to heat medium 15b, and is then again sucked into the corresponding pump 21a and pump 21b.

Note that in the pipes 5 in each use side heat exchanger 26, the heat medium flows in a direction from the second heat medium flow switching device 23 through the heat medium flow rate control device 25 to the first heat medium flow switching device 22. Furthermore, the air-conditioning load required in the indoor space 7 can be covered by controlling the difference between a temperature detected by the first temperature sensor 31a or that detected by the first temperature sensor 31b and a temperature detected by the second temperature sensor 34 to be kept to a target value. As regards a temperature at the outlet of each heat exchanger related to heat medium 15, either of the temperature detected by the first temperature sensor 31a and that by the first temperature sensor 31b may be used or the mean temperature of them may be used.

At this time, the opening-degree of each of the first heat medium flow switching devices 22 and the second heat medium flow switching devices 23 is set to a medium degree such that flow paths to both of the heat exchanger related to heat medium 15a and the heat exchanger related to heat medium 15b are maintained. Although the use side heat exchanger 26a should essentially be controlled on the basis of the difference between a temperature at the inlet and that at the outlet, since the temperature of the heat medium on the inlet side of the use side heat exchanger 26 is substantially the same as that detected by the first temperature sensor 31b, the use of the first temperature sensor 31b can reduce the number of temperature sensors, and thus an inexpensive system can be constructed.

Upon carrying out the heating only operation mode, since it is unnecessary to supply the heat medium to a use side heat exchanger 26 having no air-conditioning load (including thermo-off), the flow path is closed by the corresponding heat medium flow rate control device 25 such that the heat medium does not flow into the use side heat exchanger 26. In FIG. 5, the heat medium flows into the use side heat exchanger 26a and the use side heat exchanger 26b because these use side heat exchangers have an air-conditioning load. On the other hand, the use side heat exchanger 26c and the use side heat exchanger 26d have no air-conditioning load and the corresponding heat medium flow rate control devices 25c and 25d are fully closed. When a heating load occurs in the use side heat exchanger 26c or the use side heat exchanger 26d, the heat medium flow rate control device 25c or the heat medium flaw rate control device 25d may be opened such that the heat medium is circulated.

[Cooling-main Operation Mode]

Figure 6:
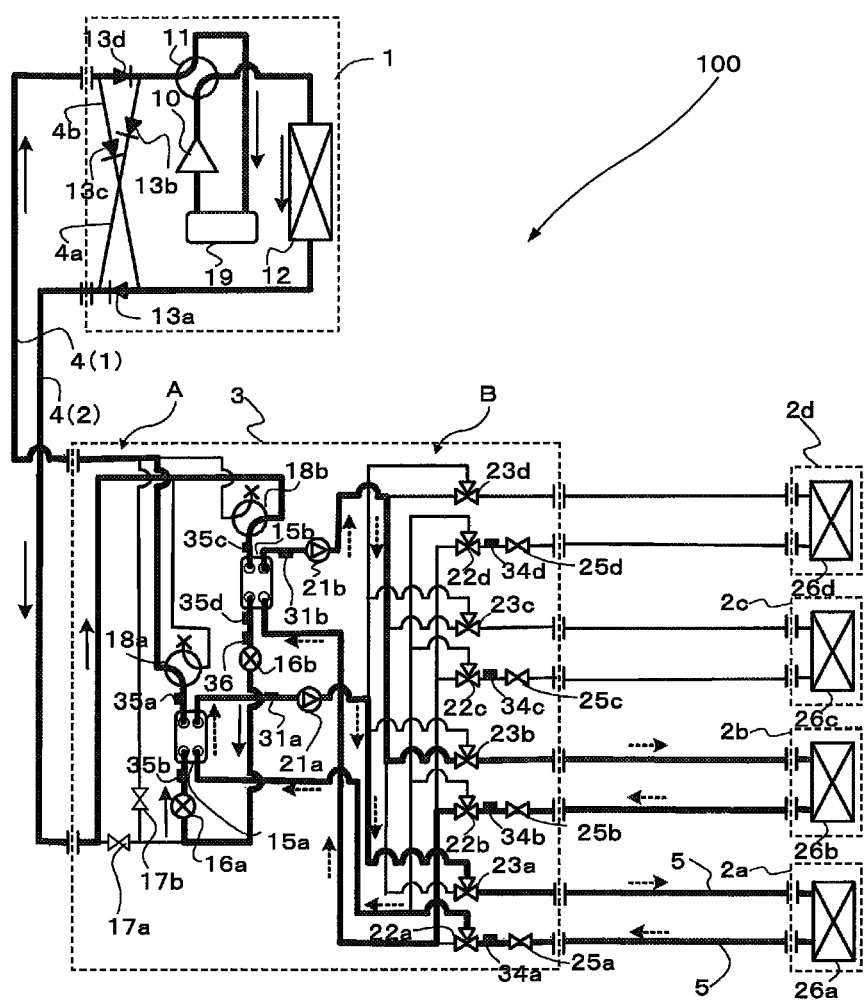
FIG. 6 is a refrigerant circuit diagram illustrating flows of the refrigerants in a cooling-main operation mode of the air-conditioning apparatus according to the Embodiment of the invention.

FIG. 6 is a refrigerant circuit diagram illustrating the flows of the refrigerants in the cooling-main operation mode of the air-conditioning apparatus 100. The cooling-main operation mode will be described with respect to a case in which a cooling load occurs in the use side heat exchanger 26a and a heating load occurs in the use side heat exchanger 26b in FIG. 6. Furthermore, in FIG. 6, pipes indicated by thick lines correspond to pipes through which the refrigerants (the heat-source-side refrigerant and the heat medium) circulate. Furthermore, the direction of flow of the heat-source-side refrigerant is indicated by solid-line arrows and the direction of flow of the heat medium is indicated by broken-line arrows in FIG. 6.

In the cooling-main operation mode illustrated in FIG. 6 the first refrigerant flow switching device 11 in the outdoor unit 1 is switched so that the heat-source-side refrigerant discharged from the compressor 10 flows into the heat source side heat exchanger 12. In the relay unit 3, the pump 21a and the pump 21b are run, the heat medium flow rate control device 25a and the heat medium flow rate control device 25b are opened, and the heat medium flow rate control device 25c and the heat medium flow rate control device 25d are closed such that the heat medium circulates between the heat exchanger related to heat medium 15a and the use side heat exchanger 26a and the heat medium circulates between the heat exchanger related to heat medium 15b and the use side heat exchanger 26b.

First, the flow of the heat-source-side refrigerant in the refrigerant circuit A will be described.

A low-temperature low-pressure refrigerant is compressed by the compressor 10 and is discharged as a high-temperature high-pressure gas refrigerant therefrom. The high-temperature high-pressure gas refrigerant discharged from the compressor 10 passes through the first refrigerant flow switching device 11 and flows into the heat source side heat exchanger 12. Then, the refrigerant condenses into a two-phase refrigerant while transferring heat to outdoor air in the heat source side heat exchanger 12. The two-phase refrigerant flowing out of the heat source side heat exchanger 12 passes through the check valve 13a, flows out of the outdoor unit 1, passes through the refrigerant pipe 4, and flows into the relay unit 3. The two-phase refrigerant flowing into the relay unit 3 passes through the second refrigerant flow switching device 18b and flows into the heat exchanger related to heat medium 15b, functioning as a condenser.

The two-phase refrigerant flowing into the heat exchanger related to heat medium 15b condenses and liquefies into a liquid refrigerant while transferring heat to the heat medium circulating in the heat medium circuit B. The liquid refrigerant flowing out of the heat exchanger related to heat medium 15b is expanded into a low-pressure two-phase refrigerant by the expansion device 16b. This low-pressure two-phase refrigerant flows through the expansion device 16a into the heat exchanger related to heat medium 15a, functioning as an evaporator. The low-pressure two-phase refrigerant flowing into the heat exchanger related to heat medium 15a takes heat away from the heat medium circulating in the heat medium circuit B to cool the heat medium, and turns into a low-pressure gas refrigerant. This gas refrigerant flows out of the heat exchanger related to heat medium 15a, flows through the second refrigerant flow switching device 18a out of the relay unit 3, passes through the refrigerant pipe 4, and again flows into the outdoor unit 1. The refrigerant flowing into the outdoor unit 1 passes through the check valve 13d and is again sucked into the compressor 10 via the first refrigerant flow switching device 11 and the accumulator 19.

At this time, the opening-degree of the expansion device 16b is controlled such that superheat, which is determined by the difference between a temperature detected by the third temperature sensor 35a and by the third temperature sensor 35b, is constant. Furthermore, the expansion device 16a is fully opened, the opening and closing device 17a is closed, and the opening and closing device 17b is closed. Also, the opening-degree of the expansion device 16b may be controlled such that subcool, which is determined by the difference between a saturation temperature converted from a pressure detected by the pressure sensor 36 and a temperature detected by the third temperature sensor 35d, is constant. Alternatively, the expansion device 16b may be fully opened and the expansion device 16a may control superheat or subcool.

Next, the flow of the heat medium in the heat medium circuit B will be described.

In the cooling-main operation mode, the heat exchanger related to heat medium 15b transfers heating energy of the heat-source-side refrigerant to the heat medium, and the heated heat medium is made to flow in the pipes 5 by the pump 21b. Furthermore, in the cooling-main operation mode, the heat exchanger related to heat medium 15a transfers cooling energy of the heat-source-side refrigerant to the heat medium, and the cooled heat medium is made to flow in the pipes 5 by the pump 21. The heat medium, which has flowed out of the pump 21a and the pump 21b while being pressurized, passes through the corresponding second heat medium flow switching device 23a and second heat medium flow switching device 23b and then flows into the corresponding use side heat exchanger 26a and use side heat exchanger 26b.

In the use side heat exchanger 26b, the heat medium transfers heat to the indoor air, thus heats the indoor space 7. Furthermore, in the use side heat exchanger 26a, the heat medium takes heat away from the indoor air, thus cools the indoor space 7. At this time, with the effect of the heat medium flow rate control device 25a and the heat medium flow rate control device 25b, the flow rates of the heat medium flowing into the use side heat exchanger 26a and the use side heat exchanger 26b are controlled to flow rates necessary to cover an air-conditioning load required in the indoor space. The heat medium, which has passed through the use side heat exchanger 26b with a slight decrease of temperature, passes through the heat medium flow rate control device 25b and the first heat medium flow switching device 22b, flows into the heat exchanger related to heat medium 15b, and is then again sucked into the pump 21b. The heat medium, which has passed through the use side heat exchanger 26a with a slight increase of temperature, passes through the heat medium flow rate control device 25a and the first heat medium flow switching device 22a, flows into the heat exchanger related to heat medium 15a, and is then again sucked into the pump 21a.

During this time, by the function of the first heat medium flow switching devices 22 and the second heat medium flow switching devices 23, the hot heat medium and the cold heat medium is introduced into the use side heat exchanger 26 having a heating load and the use side heat exchanger 26 having a cooling load, respectively, without being mixed. Note that in the pipes 5 in each of the use side heat exchanger 26 for heating and that for cooling, the heat medium flows in a direction in which it flows from the second heat medium flow switching device 23 through the heat medium flow rate control device 25 to the first heat medium flow switching device 22. Furthermore, the air-conditioning load required in the indoor space 7 to be heated can be covered by controlling the difference between a temperature detected by the first temperature sensor 31b and that by the second temperature sensor 34 to be kept to a target value and the air-conditioning load required in the indoor space 7 to be cooled can be covered by controlling the difference between a temperature detected by the second temperature sensor 34 and that by the first temperature sensor 31a to be kept to a target value.

Upon carrying out the cooling-main operation mode, since it is unnecessary to supply the heat medium to a use side heat exchanger 26 having no air-conditioning load (including thermo-off), the flow path is closed by the corresponding heat medium flow rate control device 25 such that the heat medium does not flow into the use side heat exchanger 26. In FIG. 6, the heat medium flows into the use side heat exchanger 26a and the use side heat exchanger 26b because these use side heat exchangers have an air-conditioning load. On the other hand, the use side heat exchanger 26c and the use side heat exchanger 26d have no air-conditioning load and the corresponding heat medium flow rate control devices 25c and 25d are fully closed. When a heating load occurs in the use side heat exchanger 26c or the use side heat exchanger 26d, the heat medium flow rate control device 25c or the heat medium flow rate control device 25d may be opened such that the heat medium is circulated.

[Heating-main Operation Mode]

Figure 7:
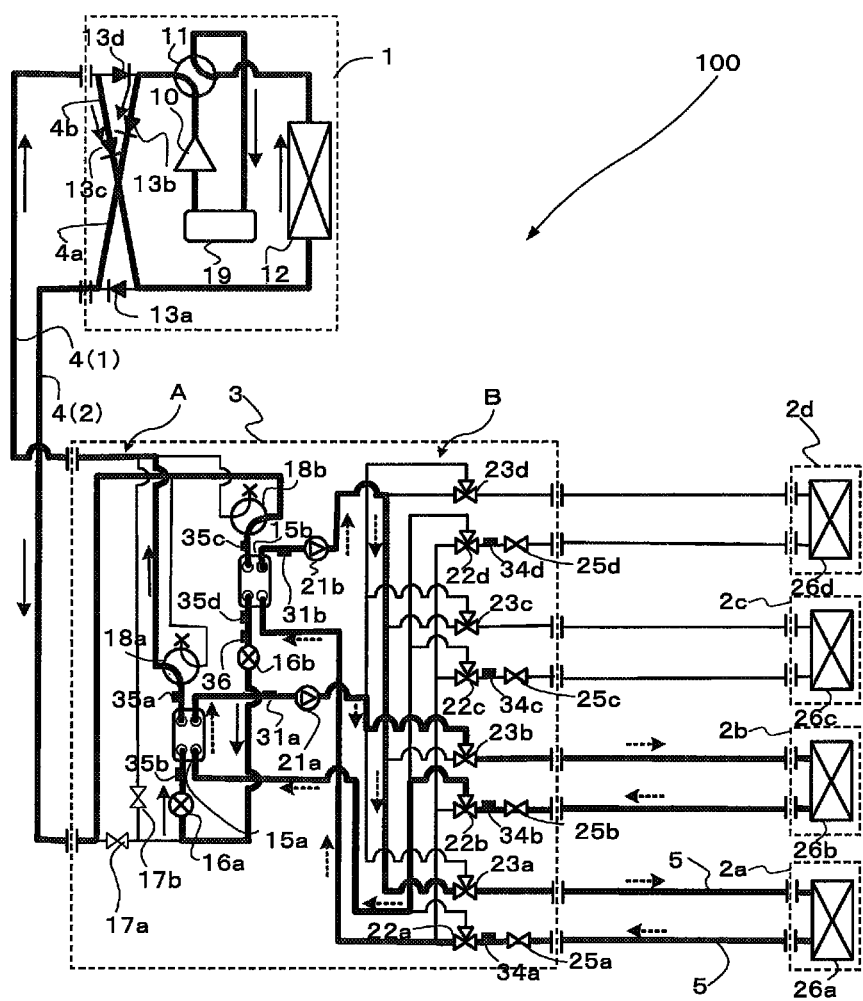
FIG. 7 is a refrigerant circuit diagram illustrating flows of the refrigerants in a heating-main operation mode of the air-conditioning apparatus according to the Embodiment of the invention.

FIG. 7 is a refrigerant circuit diagram illustrating the flows of the refrigerants in the heating-main operation mode of the air-conditioning apparatus 100. The heating-main operation mode will be described with respect to a case in which a heating load occurs in the use side heat exchanger 26a and a cooling load occurs in the use side heat exchanger 26b in FIG. 7. Furthermore, in FIG. 7, pipes indicated by thick lines correspond to pipes through which the refrigerants (the heat-source-side refrigerant and the heat medium) circulate. Furthermore, the direction of flow of the heat-source-side refrigerant is indicated by solid-line arrows and the direction of flow of the heat medium indicated by broken-line arrows in FIG. 7.

In the heating-main operation mode illustrated in FIG. 7, the first refrigerant flow switching device 11 in the outdoor unit 1 is switched so that the heat-source-side refrigerant discharged from the compressor 10 flows into the relay unit without passing through the heat source side heat exchanger 12. In the relay unit 3, the pump 21a and the pump 21b are run, the heat medium flow rate control device 25a and the heat medium flow rate control device 25b are opened, and the heat medium flow rate control device 25c and the heat medium flow rate control device 25d are closed such that the heat medium circulates between each of the heat medium heat exchanger 15a and the use side heat exchanger 26b and between the heat medium heat exchanger 15b and the use side heat exchanger 26a.

First, the flow of the heat-source-side refrigerant in the refrigerant circuit A will be described.

A low-temperature low-pressure refrigerant is compressed by the compressor 10 and is discharged as a high-temperature high-pressure gas refrigerant therefrom. The high-temperature high-pressure gas refrigerant discharged from the compressor 10 passes through the first refrigerant flow switching device 11, flows through the first connecting pipe 4a, passes through the check valve 13b, and flows out of the outdoor unit 1. The high-temperature high-pressure gas refrigerant, which has flowed out of the outdoor unit 1, passes through the refrigerant pipe 4 and flows into the relay unit 3. The high-temperature high-pressure gas refrigerant flowing into the relay unit 3 passes through the second refrigerant flow switching device 18b and flows into the heat exchanger related to heat medium 15b, functioning as a condenser.

The gas refrigerant flowing into the heat exchanger related to heat medium 15b condenses and liquefies into a liquid refrigerant while transferring heat to the heat medium circulating in the heat medium circuit B. The liquid refrigerant flowing out of the heat exchanger related to heat medium 15b is expanded into a low-pressure two-phase refrigerant by the expansion device 16b. This low-pressure two-phase refrigerant flows through the expansion device 16a into the heat exchanger related to heat medium 15a, functioning as an evaporator. The low-pressure two-phase refrigerant flowing into the heat exchanger related to heat medium 15a takes heat away from the heat medium circulating in the heat medium circuit B to evaporate, cooling the heat medium. This low-pressure two-phase refrigerant flows out of the heat exchanger related to heat medium 15a, flows out of the relay unit 3 via the second refrigerant flow switching device 18a, passes through the refrigerant pipe 4, and again flows into the outdoor unit 1.

The refrigerant flowing into the outdoor unit 1 passes through the check valve 13c and flows into the heat source side heat exchanger 12, functioning as an evaporator. The refrigerant flowing into the heat source side heat exchanger 12 takes heat away from the outdoor air in the heat source side heat exchanger 12 and turns into a low-temperature low-pressure gas refrigerant. The low-temperature low-pressure gas refrigerant flowing out of the heat source side heat exchanger 12 is again sucked into the compressor 10 via the first refrigerant flow switching device 11 and the accumulator 19.

At this time, the opening-degree of the expansion device 16b is controlled such that subcool, which is determined by the difference between a saturation temperature converted from a pressure detected by the pressure sensor 36 and a temperature detected by the third temperature sensor 35b, is constant. Furthermore, the expansion device 16a is fully opened, the opening and closing device 17a is closed, and the opening and closing device 17b is closed. Alternatively, the expansion device 16b may be fully opened and the expansion device 16a may control subcool.

Next, the flow of the heat medium in the heat medium circuit B will be described.

In the heating-main operation mode, the heat exchanger related to heat medium 15b transfers heating energy of the heat-source-side refrigerant to the heat medium, and the heated heat medium is made to flow in the pipes 5 by the pump 21b. Furthermore, in the heating-main operation mode, the heat exchanger related to heat medium 15a transfers cooling energy of the heat-source-side refrigerant to the heat medium, and the cooled heat medium is made to flow in the pipes 5 by the pump 21. The heat medium, which has flowed out of the pump 21a and the pump 21b while being pressurized, passes through the corresponding second heat medium flow switching device 23a and second heat medium flow switching device 23b and then flows into the corresponding use side heat exchanger 26a and use side heat exchanger 26b.

In the use side heat exchanger 26b, the heat medium takes heat away from the indoor air, thus cools the indoor space 7. Furthermore, in the use side heat exchanger 26a, the heat medium transfers heat to the indoor air, thus heats the indoor space 7. At this time, with the effect of the heat medium flow rate control device 25a and the heat medium flow rate control device 25b, the flow rates of the heat medium flowing into the use side heat exchanger 26a and the use side heat exchanger 26b are controlled to flow rates necessary to cover an air-conditioning load required in the indoor space. The heat medium, which has passed through the use side heat exchanger 26b with a slight increase of temperature, passes through the heat medium flow rate control device 25b and the first heat medium flow switching device 22b, flows into the heat exchanger related to heat medium 15a, and is then again sucked into the pump 21a. The heat medium, which has passed through the use side heat exchanger 26a with a slight decrease of temperature, passes through the heat medium flow rate control device 25a and the first heat medium flow switching device 22a, flows into the heat exchanger related to heat medium 15b, and is then again sucked into the pump 21b.

During this time, by the function of the first heat medium flow switching devices 22 and the second heat medium flow switching devices 23, the hot heat medium and the cold heat medium is introduced into the use side heat exchanger 26 having a heating load and the use side heat exchanger 26 having a cooling load, respectively, without being mixed. Note that in the pipes 5 in each of the use side heat exchanger 26 for heating and that for cooling, the heat medium flows in a direction in which it flows from the second heat medium flow switching device 23 through the heat medium flow rate control device 25 to the first heat medium flow switching device 22. Furthermore, the air-conditioning load required in the indoor space 7 to be heated can be covered by controlling the difference between a temperature detected by the first temperature sensor 31b and that by the second temperature sensor 34 to be kept to a target value and the air-conditioning load required in the indoor space 7 to be cooled can be covered by controlling the difference between a temperature detected by the second temperature sensor 34 and that by the first temperature sensor 31a to be kept to a target value.

Upon carrying out the heating-main operation mode, since it is unnecessary to supply the heat medium to>a use side heat exchanger 26 having no air-conditioning load (including thermo-off), the flow path is closed by the corresponding heat medium flow rate control device 25 such that the heat medium does not flow into the use side heat exchanger 26. In FIG. 7, the heat medium flows into the use side heat exchanger 26a and the use side heat exchanger 26b because these use side heat exchangers have an air-conditioning load. On the other hand, the use side heat exchanger 26c and the use side heat exchanger 26d have no air-conditioning load and the corresponding heat medium flow rate control devices 25c and 25d are fully closed. When a heating load occurs in the use side heat exchanger 26c or the use side heat exchanger 26d, the heat medium flow rate control device 25c or the heat medium flow rate control device 25d may be opened such that the heat medium is circulated.

Subsequently, a heat medium flow rate control operation of each heat medium flow rate control device 25 will be described in detail with reference to FIG. 8.

Figure 8:
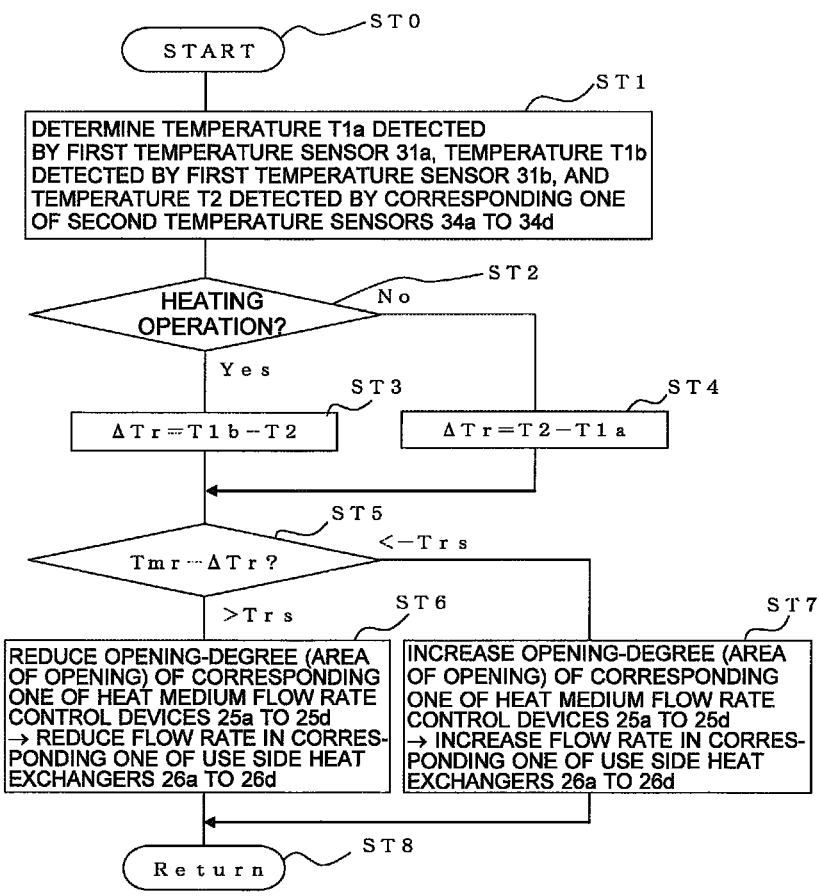
FIG. 8 is a flowchart illustrating a control operation of each heat medium flow rate control device of the air-conditioning apparatus according to the Embodiment of the invention.

FIG. 8 is a flowchart illustrating a control operation of each heat medium flow rate control device of the air-conditioning apparatus according to the Embodiment of the invention. FIG. 8 is a flowchart corresponding to a single indoor unit 2 and this process is performed in each indoor unit 2. For example, when an operation of the air-conditioning apparatus 100 is started, the controller starts the process for flow rate control depicted in the flowchart of FIG. 8 (ST0), and determines a temperature T1a detected by the first temperature sensor 31a, a temperature T1b detected by the first temperature sensor 31b, and a temperature T2 detected by the corresponding one of the second temperature sensors 34a to 34d (ST1). When the corresponding one of the use side heat exchangers 26a to 26d performs the heating operation, a value obtained by subtracting 12 from T1b is set as an inlet-outlet temperature difference ΔTr of the use side heat exchanger 26 (ST2, ST3). In the operations other than the heating operation, for example, the cooling operation and a defrosting operation, a value obtained by subtracting T1a from T2 is set as the inlet-outlet temperature difference ΔTr of the use side heat exchanger 26 (ST2, ST4).

Subsequently, the inlet-outlet temperature difference ΔTr of the corresponding one of the use side heat exchangers 26a to 26d is compared with a control target value Tmr (ST5). If a value obtained by subtracting Tmr from ΔTr is greater than a range of equilibrium Trs, the opening-degree (area of opening) of the heat medium flow rate control device 25 is reduced, namely, the flow rate in the use side heat exchanger 26 is reduced (ST6). If the value obtained by subtracting Tmr from ΔTr is less than a range of equilibrium −Trs, the opening-degree (area of opening) of the heat medium flow rate control device 25 is increased, namely, the flow rate in the use side heat exchanger 26 is increased (ST7). The series of processing steps ends (ST8). The control is again performed at the next control timing. For example, in the case in which the cooling operation is performed, the control target value is 5 degrees C., and the range of equilibrium is 1 degree C., if the inlet-outlet temperature difference ΔTr of the use side heat exchanger 26a is 3 degrees C., the opening-degree (area of opening) of the heat medium flow rate control device 25a is controlled such that the flow rate in the use side heat exchanger 26a is reduced. If the inlet-outlet temperature difference ΔTr of the use side heat exchanger 26a is 7 degrees C., the opening-degree (area of opening) of the heat medium flow rate control device 25a is controlled such that the flow rate in the use side heat exchanger 26a is increased, This brings the inlet-outlet temperature difference ΔTr of the use side heat exchanger 26a close to the control target. The range of equilibrium may be omitted such that it is set to 0 degree C. It is, however, preferable to set the range of equilibrium, because the number of times to control the heat medium flow rate control devices 25a to 25d is reduced, thus extending the life of each heat medium flow rate control device 25.

Figure 9:
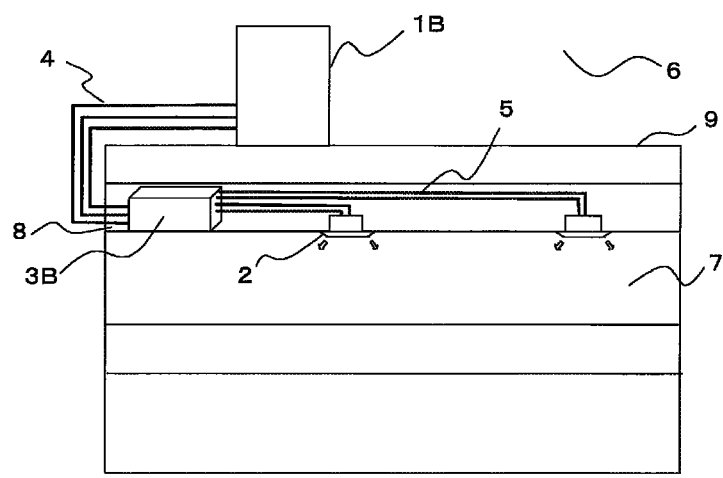
FIG. 9 is a schematic diagram illustrating an installation of the air-conditioning apparatus according to the Embodiment of the invention.
Figure 10:
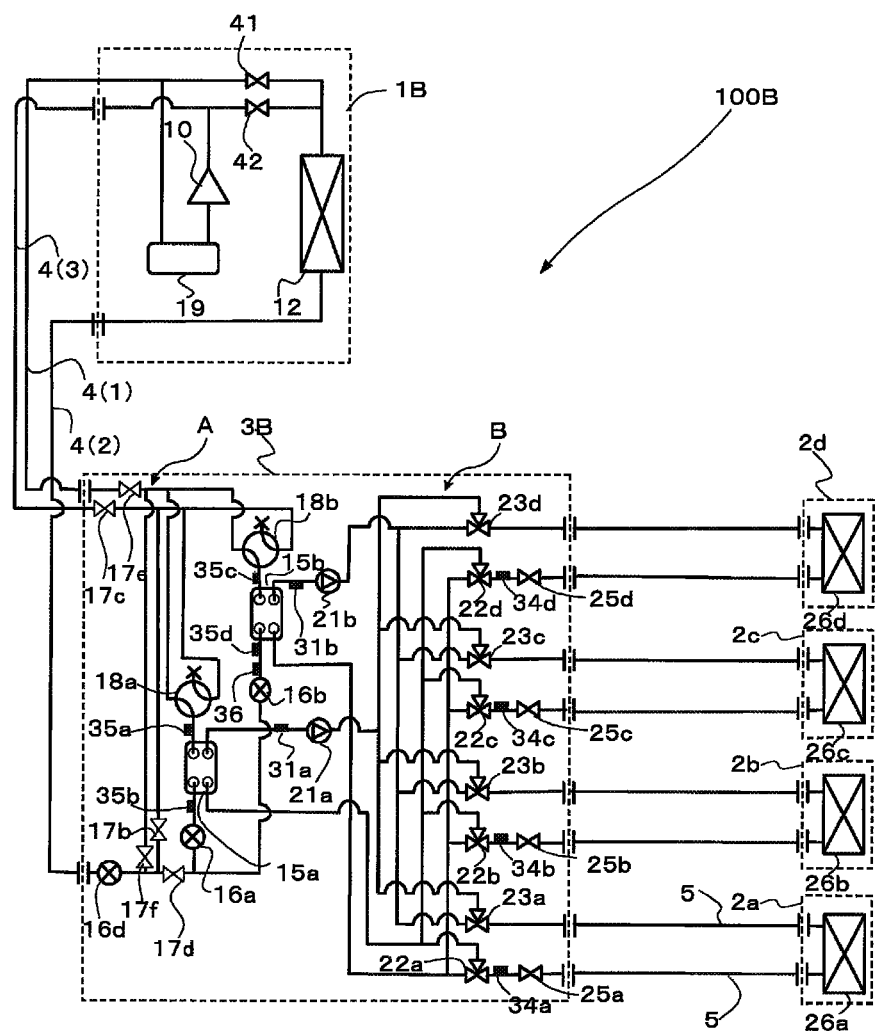
FIG. 10 is a schematic circuit diagram illustrating another configuration of the air-conditioning apparatus according to the Embodiment of the invention.

Furthermore, the air-conditioning apparatus according to the Embodiment may be an air-conditioning apparatus (hereinafter, referred to as an "air-conditioning apparatus 100B") including an outdoor unit (hereinafter, referred to as an "outdoor unit 1B") and a relay unit (hereinafter, referred to as a "relay unit 3B") connected through three refrigerant pipes 4 (a refrigerant pipe 4(1), a refrigerant pipe 4(2), a refrigerant pipe 4(3)) as illustrated in FIG. 10, Furthermore, FIG. 9 illustrates an installation of the air-conditioning apparatus 100B. That is, the air-conditioning apparatus 100B allows all of the indoor units 2 to perform the same operation and also allows the indoor units 2 to perform different operations. Furthermore, in the relay unit 3B, the refrigerant pipe 4(2) is provided with an expansion device 16d (such as an electronic expansion valve) merging the high-pressure liquid in the cooling-main operation mode.

The basic configuration of the air-conditioning apparatus 100B is the same as that of the air-conditioning apparatus 100 but the structure of the outdoor unit 1B and that of the relay unit 3B are slightly different from those in the air-conditioning apparatus 100. The outdoor unit 1B includes a compressor 10, a heat source side heat exchanger 12, an accumulator 19, and two flow switching units (flow switching unit 41 and flow switching unit 42). The relay unit 3B does not have the opening and closing device 17a and the refrigerant pipe which branches the refrigerant pipe 4(2) connecting to a second refrigerant flow switching device 18b. Instead, the relay unit 3B includes an opening and closing device 17c and an opening and closing device 17d and is configured such that a branch pipe provided with the opening and closing device 17b is connected to the refrigerant pipe 4(3). The relay unit 3B further includes a branch pipe connecting the refrigerant pipe 4(1) and the refrigerant pipe 4(2), an opening and closing device 17e, and an opening and closing device 17f.

The refrigerant pipe 4(3) connects a discharge pipe of the compressor 10 and the relay unit 38. Each of the two flow switching units is constituted by, for example, a two-way valve and is configured to open and close the refrigerant pipes 4. The flow switching unit 41 is disposed between a suction pipe of the compressor 10 and the heat source side heat exchanger 12 and is configured to switch the flow directions of the heat-source-side refrigerant by control of the opening and closing. The flow switching unit 42 is disposed between the discharge pipe of the compressor 10 and the heat source side heat exchanger 12 and is configured to switch the flow directions of the heat-source-side refrigerant by control of the opening and closing.

Each of the opening and closing devices 17c to 17f is constituted by, for example, a two-way valve and is configured to open and close the refrigerant pipes 4. The opening and closing device 17c is provided in the refrigerant pipe 4(3) in the relay unit 3B and is configured to open and close the refrigerant pipe 4(3). The opening and closing device 17d is provided in the refrigerant pipe 4(2) in the relay unit 3B and is configured to open and close the refrigerant pipe 4(2). The opening and closing device 17e is provided in the refrigerant pipe 4(1) in the relay unit 3B and is configured to open and close the refrigerant pipe 4(1). The opening and closing device 17f is provided in the branch pipe connecting the refrigerant pipe 4(1) and the refrigerant pipe 4(2) in the relay unit 3B and is configured to open and close this branch pipe. The opening and closing device 17e and the opening and closing device 17f allow the refrigerant to flow into the heat source side heat exchanger 12 in the outdoor unit 1B.

Operation modes carried out by the air-conditioning apparatus 100B will be described in brief below with reference to FIG. 11. Furthermore, since the flow of the heat medium in the heat medium circuit B is the same as that in the air-conditioning apparatus 100, explanation is omitted.

[Cooling Only Operation Mode]

In this cooling only operation mode, control is performed such that the flow switching unit 41 is closed, the flow switching unit 42 is opened, the opening and closing device 17b is closed, the opening and closing device 17c is closed, the opening and closing device 17d is opened, the opening and closing device 17e is opened, and the opening and closing device 17f is closed.

A low-temperature low-pressure refrigerant is compressed by the compressor 10 and is discharged as a high-temperature high-pressure gas refrigerant therefrom. The whole of the high-temperature high-pressure gas refrigerant discharged from the compressor 10 flows into the heat source side heat exchanger 12 through the flow switching unit 42. The refrigerant condenses into a high-pressure liquid refrigerant in the heat source side heat exchanger 12 while transferring heat to the outdoor air. The high-pressure liquid refrigerant flowing out of the heat source side heat exchanger 12 passes through the refrigerant pipe 4(2) and flows into the relay unit 3B. The high-pressure liquid refrigerant flowing into the relay unit 3B is branched and expanded into a low-temperature low-pressure two-phase refrigerant through the expansion device 16a and the expansion device 16b.

This two-phase refrigerant flows into each of the heat exchanger related to heat medium 15a and the heat exchanger related to heat medium 15b, functioning as evaporators, takes heat away from the heat medium circulating in the heat medium circuit B to cool the heat medium, and thus turns into a low-temperature low-pressure gas refrigerant. The gas refrigerant flowing out of the heat exchanger related to heat medium 15a and that flowing out of the heat exchanger related to heat medium 15b pass through the second refrigerant flow switching device 18a and the second refrigerant flow switching device 18b, respectively, and then merge together. The resultant refrigerant passes through the opening and closing device 17e. flows out of the relay unit 3B, passes through the refrigerant pipe 4(1), and again flows into the outdoor unit 1B. The refrigerant flowing into the outdoor unit 1B is again sucked into the compressor 10 through the accumulator 19.

[Heating Only Operation Mode]

In this heating only operation mode, control is performed such that the flow switching unit 41 is opened, the flow switching unit 42 is closed, the opening and closing device 17b is closed, the opening and closing device 17c is opened, the opening and closing device 17d is opened, the opening and closing device 17e is closed, and the opening and closing device 17f is closed.

A low-temperature low-pressure refrigerant is compressed by the compressor 10 and is discharged as a high-temperature high-pressure gas refrigerant therefrom. The whole of the high-temperature high-pressure gas refrigerant discharged from the compressor 10 passes through the refrigerant pipe 4(3) and flows out of the outdoor unit 1B. The high-temperature high-pressure gas refrigerant flowing out of the outdoor unit 1B passes through the refrigerant pipe 4(3) and flows into the relay unit 3B. The high-temperature high-pressure gas refrigerant flowing into the relay unit 3B is branched. The refrigerant passes through each of the second refrigerant flow switching device 18a and the second refrigerant flow switching device 18b and flows into the corresponding heat exchanger related to heat medium 15a and the heat exchanger related to heat medium 15b.

The high-temperature high-pressure gas refrigerant flowing into each of the heat exchanger related to heat medium 15a and the heat exchanger related to heat medium 15b condenses and liquefies into a high-pressure liquid refrigerant while transferring heat to the heat medium circulating in the heat medium circuit B. The liquid refrigerant flowing out of the heat exchanger related to heat medium 15a and that flowing out of the heat exchanger related to heat medium 15b are expanded into a low-temperature low-pressure two-phase refrigerant through the expansion device 16a and the expansion device 16b. This two-phase refrigerant passes through the opening and closing device 17d, flows out of the relay unit 3B, passes through the refrigerant pipe 4(2), and again flows into the outdoor unit 1B.

The refrigerant flowing into the outdoor unit 1B flows into the heat source side heat exchanger 12, functioning as an evaporator. The refrigerant flowing into the heat source side heat exchanger 12 takes heat away from the outdoor air in the heat source side heat exchanger 12 and thus turns into a low-temperature low-pressure gas refrigerant. The low-temperature low-pressure gas refrigerant flowing out of the heat source side heat exchanger 12 passes through the flow switching unit 41 and the accumulator 19, and is again sucked into the compressor 10.

[Cooling-main Operation Mode]

The cooling-main operation mode will be described with respect to a case in which a cooling load occurs in the use side heat exchanger 26a and a heating load occurs in the use side heat exchanger 26b. Note that in the cooling-main operation mode, control is performed such that the flow switching unit 41 is closed, the flow switching unit 42 is opened, the opening and closing device 17b is opened, the opening and closing device 17c is closed, the opening and closing device 17d is closed, the opening and closing device 17e is opened, and the opening and closing device 17f is closed.

A low-temperature low-pressure refrigerant is compressed by the compressor 10 and is discharged as a high-temperature high-pressure gas refrigerant therefrom. The whole of the high-temperature high-pressure gas refrigerant discharged from the compressor 10 flows through the flow switching unit 42 into the heat source side heat exchanger 12. The refrigerant condenses into a two-phase refrigerant in the heat source side heat exchanger 12 while transferring heat to the outside air. The two-phase refrigerant, which has flowed out of the heat source side heat exchanger 12, passes through the refrigerant pipe 4(2) and flows into the relay unit 3B. The two-phase refrigerant flowing into the relay unit 3B passes through the opening and closing device 17b and the second refrigerant flow switching device 18b and flows into the heat exchanger related to heat medium 15b, functioning as a condenser.

The two-phase refrigerant flowing into the heat exchanger related to heat medium 15b condenses into a liquid refrigerant while transferring heat to the heat medium circulating in the heat medium circuit B. The liquid refrigerant flowing out of the heat exchanger related to heat medium 15b is expanded into a low-pressure two-phase refrigerant by the expansion device 16b. This low-pressure two-phase refrigerant flaws through the expansion device 16a into the heat exchanger related to heat medium 15a, functioning as an evaporator. The low-pressure two-phase refrigerant flowing into the heat exchanger related to heat medium 15a takes heat away from the heat medium circulating in the heat medium circuit B to cool the heat medium, and turns into a low-pressure gas refrigerant. This gas refrigerant flows out of the heat exchanger related to heat medium 15a, flows out of the relay unit 3B through the second refrigerant flow switching device 18a and the opening and closing device 17e, passes through the refrigerant pipe 4(1), and again flows into the outdoor unit 1B. The refrigerant flowing into the outdoor unit 1B passes through the accumulator 19 and is then again sucked into the compressor 10.

[Heating-main Operation Mode]

The heating-main operation mode will be described with respect to a case in which a heating load occurs in the use side heat exchanger 26a and a cooling load occurs in the use side heat exchanger 26b. Note that in the heating-main operation mode, control is performed such that the flow switching unit 41 is opened, the flow switching unit 42 is closed, the opening and closing device 17b is closed, the opening and closing device 17c is opened, the opening and closing device 17d is closed, the opening and closing device 17e is closed, and the opening and closing device 17f is opened A low-temperature low-pressure refrigerant is compressed by the compressor 10 and is discharged as a high-temperature high-pressure gas refrigerant therefrom. The whole of the high-temperature high-pressure gas refrigerant discharged from the compressor 10 passes through the refrigerant pipe 4(3) and flows out of the outdoor unit 1B. The high-temperature high-pressure gas refrigerant flowing out of the outdoor unit 1B passes through the refrigerant pipe 4(3) and flows into the relay unit 3B. The high-temperature high-pressure gas refrigerant flowing into the relay unit 3B passes through the opening and closing device 17c and the second refrigerant flow switching device 18b and flows into the heat exchanger related to heat medium 15b, functioning as a condenser.

The gas refrigerant flowing into the heat exchanger related to heat medium 15b condenses into a liquid refrigerant while transferring heat to the heat medium circulating in the heat medium circuit B. The liquid refrigerant flowing out of the heat exchanger related to heat medium 15b is expanded into a low-temperature low-pressure two-phase refrigerant by the expansion device 16b. This low-temperature low-pressure two-phase refrigerant flows through the expansion device 16a into the heat exchanger related to heat medium 15a, functioning as an evaporator. The low-temperature low-pressure two-phase refrigerant flowing into the heat exchanger related to heat medium 15a takes heat away from the heat medium circulating in the heat medium circuit B to evaporate, and cools the heat medium. This low-temperature low-pressure two-phase refrigerant flows out of the heat exchanger related to heat medium 15a, passes through the second refrigerant flow switching device 18a and the opening and closing device 17f, flows out of the relay unit 3B, passes through the refrigerant pipe 4(2), and again flows into the outdoor unit 1B.

The refrigerant flowing into the outdoor unit 1B flows into the heat source side heat exchanger 12, functioning as an evaporator. The refrigerant flowing into the heat source side heat exchanger 12 takes heat away from the outdoor air in the heat source side heat exchanger 12 and turns into a low-temperature low-pressure gas refrigerant. The low-temperature low-pressure gas refrigerant flowing out of the heat source side heat exchanger 12 is again sucked into the compressor 10 through the flow switching unit 41 and the accumulator 19.

As described above, in the heating only operation mode and the cooling only operation mode, flow paths through which the heat medium circulate are formed between all of the heat exchangers related to heat medium 15 and at least one of the use side heat exchangers 26. Consequently, the area of heat transfer when the refrigerant evaporates or condenses can be increased. Thus, energy efficiency can be improved and energy saving can be achieved.

The first heat medium flow switching devices 22a to 22d and the second heat medium flow switching devices 23a to 23d each is constituted by a three-way valve. In the cooling only operation mode and the heating only operation mode, the first heat medium flow switching devices 22a to 22d and the second heat medium flow switching devices 23a to 23d corresponding to the operating use side heat exchangers 26a to 26d are allowed to have a medium opening-degree such that the heat medium flows into both of the heat exchangers related to heat medium 15a and 15b. Consequently, the area of heat transfer when the refrigerant evaporates or condenses can be increased. Thus, the energy efficiency can be improved and energy saving can be achieved.

In the cooling-main operation mode and the heating-main operation mode, a flow path through which the heat medium circulates is formed between the heat exchanger related to heat medium 15 heating the heat medium and at least one of the use side heat exchangers 26 and a flow path through which the heat medium circulates is formed between the heat exchanger related to heat medium 15 cooling the heat medium and at least another one of the use side heat exchangers 26. Consequently, the cooling operation and the heating operation can be simultaneously achieved in the use side heat exchangers 26.

In the cooling-main operation mode and the heating-main operation mode, during the cooling and heating mixed operation, the heat exchangers related to heat medium 15a and 15b are used for heating and for cooling, respectively, and the first heat medium flow switching devices 22a to 22d and the second heat medium flow switching devices 23a to 23d corresponding to the operating use side heat exchangers 26a to 26d are allowed to switch flow directions in accordance with the operation mode, thus simultaneously achieving the cooling operation and the heating operation.

Furthermore, in the case in which the heating load and the cooling load simultaneously occur in the use side heat exchangers 26, the first heat medium flow switching device 22 and the second heat medium flow switching device 23 corresponding to the use side heat exchanger 26 which performs the heating operation are switched to the flow path connected to the heat exchanger related to heat medium 15b for heating, and the first heat medium flow switching device 22 and the second heat medium flow switching device 23 corresponding to the use side heat exchanger 26 which performs the cooling operation are switched to the flow path connected to the heat exchanger related to heat medium 15a for cooling, so that the heating operation or cooling operation can be freely performed in each indoor unit 2.

In a related art, since the temperature difference of the heat medium at the inlet and the outlet of the corresponding one of the use side heat exchangers 26a to 26d are used to control each heat medium flow rate control device 25, the first temperature sensor 31 is disposed at a position in the pipe 5(1) (refer to FIG. 3) to detect a temperature at the inlet. According to the Embodiment, each heat medium flow rate control device 25 is controlled on the basis of the difference between a temperature detected by each of the first temperature sensors 31a and 31b each detecting the temperature of the heat medium at the outlet of the corresponding heat exchanger related to heat medium 15 and a temperature detected by the corresponding one of the second temperature sensors 34a to 34d each detecting the temperature of the heat medium flowing out of the corresponding one of the use side heat exchangers 26a to 26d. Since the distance between the outlet of each heat exchanger related to heat medium 15 and the pipe 5(1) is short and they are arranged in the same housing, heat loss is small and a temperature detected at a position in the pipe 5(1) is not significantly different from a temperature detected at the outlet of each heat exchanger related to heat medium 15. Accordingly, the first temperature sensor 31 provided in each heat exchanger related to heat medium 15 is used instead of disposing the first temperature sensor 31 at a position in the pipe 5(1), thus reducing the number of temperature detecting means to be arranged. The system can be constructed inexpensively.

Furthermore, in the air-conditioning apparatus 100, the outdoor unit 1 is connected to the relay unit 3 via the refrigerant pipes 4 through which the heat-source-side refrigerant is conveyed. The relay unit 3 is connected to each indoor unit 2 via the pipes 5 through which the heat medium is conveyed. Cooling energy or heating energy generated in the outdoor unit 1 is exchanged with the heat medium through the relay unit 3 and is delivered to the indoor units 2. Accordingly, the refrigerant does not circulate in or near each indoor unit 2, thus eliminating the possibility of leakage of the refrigerant into, for example, an indoor space. Therefore, safety can be improved.

Furthermore, the relay unit 3 separate from the outdoor unit 1 exchanges heat between the heat-source-side refrigerant and the heat medium. Accordingly, the length of pipes 5 through which the heat medium circulates can be made short, and less conveyance power is required. Thus, safety can be improved while energy saving can be achieved.

Moreover, the relay unit 3 is connected to each indoor unit 2 using the two pipes 5. Flow paths between the use side heat exchanger 26 in each indoor unit 2 and the heat exchangers related to heat medium 15 housed in the relay unit 3 are changed in accordance with the operation mode. Accordingly, cooling or heating can be selected in each indoor unit 2 connected through the two pipes 5. Thus, the pipes through which the heat medium circulates can be easily and safely constructed.

Furthermore, the outdoor unit 1 is connected to the relay unit 3 using the two refrigerant pipes 4. The refrigerant pipes 4 can be easily and safely constructed.

And furthermore, the pump 21 is provided in each heat exchanger related to heat medium 15. Accordingly, it is unnecessary to provide the pump 21 in each indoor unit 2. Thus, the air-conditioning apparatus 100 can be constructed inexpensively. Additionally, noise caused by the pumps can be reduced.

Moreover, each of the use side heat exchangers 26 is connected in parallel to the heat exchangers related to heat medium 15 through the first heat medium flow switching device 22 and the second heat medium flow switching device 23. Accordingly, even if a plurality of indoor units 2 are arranged, the heat medium that has heat exchanged does not flow into the same flow path as that of the heat medium before heat exchange, thus allowing each indoor unit 2 to exhibit a maximum capacity. Consequently, waste of energy is reduced, thus achieving energy saving.

Furthermore, although the Embodiment has been described with respect to the case in which the number of heat exchangers related to heat medium 15 is two, the arrangement is not limited to this case. As long as the heat exchanger related to heat medium 15 is configured to be capable of cooling or/and heating the heat medium, the number of arranged heat exchangers related to heat medium 15 is not limited. For example, in the case in which two or more heat exchangers related to heat medium 15 are used, the heat exchangers related to heat medium 15 may be divided into two groups each including one or a plurality of heat exchangers related to heat medium 15, and the first heat medium flow switching devices 22 and the second heat medium flow switching devices 23 may perform switching between a flow path from one group to the use side heat exchangers 26 and a flow path from the other group to the use side heat exchangers 26 such that the heat medium is heated or cooled by each group in accordance with each operation mode.

It should be noted that although the second temperature sensors 34a to 34d described in the Embodiment are depicted such that each second temperature sensor 34 is disposed between the corresponding one of the first heat medium flow switching devices 22a to 22d and the corresponding one of the heat medium flow rate control devices 25a to 25d, the arrangement is not limited to this. Each second temperature sensor 34 may be disposed at any position in a flow path from the outlet side of the corresponding one of the use side heat exchangers 26a to 26d to the corresponding one of the first heat medium flow switching devices 22a to 22d. Furthermore, each of the heat medium flow rate control devices 25a to 25d may be disposed at any position in a flow path from the corresponding one of the second heat medium flow switching devices 23a to 23d to the inlet side of the corresponding one of the use side heat exchangers 26a to 26d.

It should be noted that each of the first heat medium flow switching devices 22 and the second heat medium flow switching devices 23 described in the Embodiment may be any component as long as it can switch flow paths, such as a three-way valve which can switch a three-way flow or a combination of, for example, two on-off valves that can close and open a two-way flow. Alternatively, as each of the first heat medium flow switching devices 22 and the second heat medium flow switching devices 23, components such as a stepping-motor-driven mixing valve capable of changing a flow rate of the three-way flow or a combination of, for example, electronic expansion valves capable of changing a flow rate of the two-way flow may be used. In this case, water hammer caused when a flow path is suddenly opened or closed can be prevented. Furthermore, the Embodiment has been described with respect to the case in which each of the heat medium flow rate control devices 25 is constituted by a stepping-motor-driven two-way valve. However, each of the heat medium flow rate control devices 25 may be constituted by a control valve having a three-way flow and the valve may be disposed with a bypass pipe that bypasses the corresponding use side heat exchanger 26.

As regards the heat-source-side refrigerant, a single refrigerant, such as R-22 or R-134a, a near-azeotropic refrigerant mixture, such as R-410A or R-404A, a non-azeotropic refrigerant mixture, such as R-407C, a refrigerant, such as $CF_3CF{=}CH_2$, containing a double bond in its chemical formula and having a relatively low global warming potential, and a mixture containing the refrigerant, or a natural refrigerant, such as $CO_2$ or propane, can be used. In the heat exchanger related to heat medium 15a or the heat exchanger related to heat medium 15b which operates to heat, a refrigerant that typically changes between two phases condenses into a liquid and a supercritical refrigerant, such as $CO_2$, is cooled in the supercritical state, Except for this, both acts in the same way and achieves the same advantages.

As regards the heat medium, for example, brine (antifreeze), water, a mixed solution of brine and water, or a mixed solution of water and an additive with a high corrosion protection effect can be used. In the air-conditioning apparatus 100, therefore, even if the heat medium leaks through the indoor unit 2 into the indoor space 7, the safety of the used heat medium is high. Accordingly, it contributes to safety improvement.

The Embodiment has been described with respect to the case in which the air-conditioning apparatus 100 includes the accumulator 19. The accumulator 19 may be omitted, Furthermore, the Embodiment has been described with respect to the case in which the air-conditioning apparatus 100 includes the check valves 13a to 13d. These components are not essential parts. It is therefore needless to say that even if the accumulator 19 and the check valves 13a to 13d are not disposed, the apparatus acts in the same way and achieves the same advantages.

Typically, each of the heat source side heat exchanger 12 and the use side heat exchangers 26 is provided with a fan in which current of air often facilitates condensation or evaporation. The structure is not limited to this case. For example, a heat exchanger, such as a panel heater, using emission can be used as the use side heat exchanger 26 and a water-cooled type heat exchanger which transfers heat using water or antifreeze can be used as the heat source side heat exchanger 12. In other words, heat exchangers configured to be capable of transferring heat or taking heat away can be used as the heat source side heat exchanger 12 and the use side heat exchanger 26 regardless of kind. Moreover, the number of use side heat exchangers 26 is not limited in particular, The Embodiment has been described with respect to the case in which one first heat medium flow switching device 22, one second heat medium flow switching device 23, and one heat medium flow rate control device 25 are connected to each use side heat exchanger 26. The arrangement is not limited to this case. A plurality of devices 22, devices 23, and devices 25 may be connected to each use side heat exchanger 26. In this case, the first heat medium flow switching devices, the second heat medium flow switching devices, and the heat medium flow rate control devices connected to the same use side heat exchanger 26 may be similarly operated.

Furthermore, the number of each pumps 21a and pumps 21b is not limited to one. A plurality of small capacity pumps may be used in parallel.

As described above, the air-conditioning apparatus 100 according to the Embodiment can perform a safe and high energy-saving operation by controlling the heat medium flow switching devices (the first heat medium flow switching devices 22 and the second heat medium flow switching devices 23), the heat medium flow rate control devices 25, and the pumps 21 for the heat medium.

REFERENCE SIGNS LIST 1 outdoor unit; 1B outdoor unit; 2 indoor unit; 2a indoor unit; 2b indoor unit; 2c indoor unit; 2d indoor unit; 3 relay unit; 36 relay unit; 3a main relay unit; 3b sub relay unit; 4 refrigerant pipe; 4a first connecting pipe; 4b second connecting pipe; 5 pipe; 6 outdoor space; 7 indoor space; 8 space; 9 structure; 10 compressor; 11 first refrigerant flow switching device; 12 heat source side heat exchanger; 13a check valve; 13b check valve, 13c check valve; 13d check valve; 14 gas-liquid separator; 15 heat exchanger related to heat medium; 15a heat exchanger related to heat medium; 15b heat exchanger related to heat medium; 16 expansion device; 16an expansion device; 16b expansion device; 16c expansion device; 17 opening and closing device; 17a opening and closing device; 17b opening and closing device; 17c opening and closing device; 17d opening and closing device; 18 second refrigerant flow switching device; 18a second refrigerant flow switching device; 18b second refrigerant flow switching device; 19 accumulator; 21 pump; 21a pump; 21b pump; 22 first heat medium flow switching device; 22a first heat medium flow switching device; 22b first heat medium flow switching device; 22c first heat medium flow switching device; 22d first heat medium flow switching device; 23 second heat medium flow switching device; 23a second heat medium flow switching device; 23b second heat medium flow switching device; 23c second heat medium flow switching device; 23d second heat medium flow switching device; 25 heat medium flow rate control device; 25a heat medium flow rate control device; 25b heat medium flow rate control device; 25c heat medium flow rate control device; 25d heat medium flow rate control device; 26 use side heat exchanger; 26a use side heat exchanger; 26b use side heat exchanger; 26c use side heat exchanger; 26d use side heat exchanger; 31 first temperature sensor; 31a first temperature sensor; 31b first temperature sensor; 34 second temperature sensor, 34a second temperature sensor; 34b second temperature sensor; 34c second temperature sensor; 34d second temperature sensor; 35 third temperature sensor; 35a third temperature sensor; 35b third temperature sensor; 35c third temperature sensor; 35d third temperature sensor; 36 pressure sensor; 41 flow switching unit; 42 flow switching unit; 100 air-conditioning apparatus; 100A air-conditioning apparatus; 100B air-conditioning apparatus; A refrigerant circuit; and B heat medium circuit.

The invention claimed is:

1. An air-conditioning apparatus comprising:
a compressor; a heat source side heat exchanger; a plurality of expansion devices; a plurality of heat exchangers related to heat medium; a plurality of pumps; and a plurality of use side heat exchangers,
the compressor, the heat source side heat exchanger, the expansion devices, and the heat exchangers related to heat medium being connected to form a refrigerant circuit in which a heat-source-side refrigerant is circulated,
the pumps, the use side heat exchangers, and the heat exchangers related to heat medium being connected to form a plurality of heat medium circuits in which a heat medium is circulated, the air-conditioning apparatus being configured to carry out:

a heating only operation mode in which a high-temperature high-pressure heat-source-side refrigerant discharged from the compressor flows into each of the heat exchangers related to heat medium to heat the heat medium;

a cooling only operation mode in which a low-temperature low-pressure heat-source-side refrigerant flows into each of the heat exchangers related to heat medium to cool the heat medium; and a cooling and heating mixed operation mode in which a high-temperature high-pressure heat-source-side refrigerant discharged from the compressor flows into one of the heat exchangers related to heat medium to heat the heat medium and a low-temperature low-pressure heat-source-side refrigerant flows into another one of the heat exchangers related to heat medium to cool the heat medium, the apparatus comprising:

a first heat medium flow switching device provided on an outlet side of each of the use side heat exchangers, the first heat medium flow switching device switching flow paths between the outlet side of the use side heat exchanger and the heat exchangers related to heat medium; and a second heat medium flow switching device provided on an inlet side of each of the use side heat exchangers, the second heat medium flow switching device switching flow paths between the inlet side of the use side heat exchanger and the heat exchangers related to heat medium, wherein in the cooling and heating mixed operation mode, the first heat medium flow switching devices and the second heat medium flow switching devices are controlled such that a flow path through which the heat medium circulates is formed between the heat exchanger related to heat medium heating the heat medium and at least one of the use side heat exchangers and a flow path through which the heat medium circulates is formed between the heat exchanger related to heat medium cooling the heat medium and at least one of the use side heat exchangers, and in the heating only operation mode and the cooling only operation mode, the flow path of the refrigerant in the refrigerant circuit is formed such that the refrigerant discharged from the compressor branches to flow in parallel into the plurality of use side heat exchangers and then the refrigerant flowed out of the plurality of use side heat exchanges merges together, the first heat medium flow switching devices are controlled to be open to each of the plurality of the heat exchangers related to heat medium such that the heat medium having flowed out from each of the use side heat exchanges flows into each of the heat exchangers related to heat medium, the second heat medium flow switching devices are controlled to be open to each of the plurality of the heat exchangers related to heat medium such that the heat medium having flowed out from each of the heat exchangers related to heat medium flows into the use side heat exchangers and a flow path through which the heat medium circulates is formed between all of the heat exchangers related to heat medium and each operating use side heat exchanger.

2. The air-conditioning apparatus of claim 1, wherein in the cooling and heating mixed operation mode, the first heat medium flow switching devices and the second heat medium flow switching devices are controlled in accordance with the operation modes in the use side heat exchangers such that a flow path through which the heat medium circulates is formed between the heat exchanger related to heat medium heating the heat medium and each use side heat exchanger having a heating load and a flow path through which the heat medium circulates is formed between the heat exchanger related to heat medium cooling the heat medium and each use side heat exchanger having a cooling load, and in the heating only operation mode and the cooling only operation mode, the first heat medium flow switching devices and the second heat medium flow switching devices are controlled in accordance with operation states of the use side heat exchangers such that a flow path through which the heat medium circulates is formed between each of the heat exchangers related to heat medium and each operating use side heat exchanger.

3. The air-conditioning apparatus of claim 1, wherein the heat exchangers related to heat medium are divided into two groups each including one or a plurality of heat exchangers related to heat medium, the first heat medium flow switching devices and the second heat medium flow switching devices switch between a flow path from one of the groups to the use side heat exchanger and a flow path from the other of the groups to the use side heat exchanger, and the heat medium is heated or cooled by each of the groups in accordance with each operation mode.

4. The air-conditioning apparatus of claim 1, further comprising:

a first temperature sensor, detecting a temperature of the heat medium, disposed at any position in flow paths from the heat exchangers related to heat medium to inlet sides of the use side heat exchangers;

a second temperature sensor, detecting a temperature of the heat medium, disposed at any position in flow paths from outlet sides of the use side heat exchangers to the first heat medium flow switching devices; and a heat medium flow rate control device, controlling the flow rate of the heat medium circulating in the use side heat exchanger, disposed between each use side heat exchanger and the corresponding first heat medium flow switching device or between the use side heat exchanger and the corresponding second heat medium flow switching device, wherein each of the heat medium flow rate control devices is controlled on the basis of the temperature detected by the first temperature sensor and the temperature detected by the second temperature sensor to control the amount of circulation of the heat medium circulating in the corresponding use side heat exchanger.

5. The air-conditioning apparatus of claim 4, wherein the first temperature sensor is provided for each heat exchanger related to heat medium such that the sensor is positioned between the heat exchanger related to heat medium and the second heat medium flow switching devices, the second temperature sensor is provided for each use side heat exchanger such that the sensor is positioned between the use side heat exchanger and the corresponding first heat medium flow switching device, and each of the heat medium flow rate control devices is controlled on the basis of a difference between a temperature detected by the corresponding first temperature sensor and a temperature detected by the corresponding second temperature sensor to control the amount of circulation of the heat medium circulating in the corresponding use side heat exchanger.

6. The air-conditioning apparatus of claim 5, wherein the compressor and the heat source side heat exchanger are housed in an outdoor unit, the expansion devices, the heat exchangers related to heat medium, the first heat medium flow switching devices, and the second heat medium flow switching devices are housed in a relay unit, each use side heat exchanger is housed in an indoor unit, the outdoor unit, the relay unit, and the indoor units separable from one another such that the units are arranged in separate positions, and the pumps and the first temperature sensors are housed in the relay unit.

7. The air-conditioning apparatus of claim 4, wherein the compressor and the heat source side heat exchanger are housed in an outdoor unit, the expansion devices, the heat exchangers related to heat medium, the first heat medium flow switching devices, and the second heat medium flow switching devices are housed in a relay unit, each use side heat exchanger is housed in an indoor unit, the outdoor unit, the relay unit, and the indoor units separable from one another such that the units are arranged in separate positions, and the heat medium flow rate control devices and the second temperature sensor are housed in the relay unit.

8. The air-conditioning apparatus of claim 1, wherein the compressor and the heat source side heat exchanger are housed in an outdoor unit, the expansion devices, the heat exchangers related to heat medium, the first heat medium flow switching devices, and the second heat medium flow switching devices are housed in a relay unit, each use side heat exchanger is housed in an indoor unit, the outdoor unit, the relay unit, and the indoor units separable from one another such that the units are arranged in separate positions.

9. The air-conditioning apparatus of claim 8, wherein the outdoor unit is connected to the relay unit through two refrigerant pipes and the relay unit is connected to each indoor unit through two heat medium pipes.

10. The air-conditioning apparatus of claim 1, wherein each of the pumps is provided for each heat exchanger related to heat medium in between the heat exchanger related to heat medium and each first heat medium flow switching device or between the heat exchanger related to heat medium and each second heat medium flow switching device, and the first heat medium flow switching devices and the second heat medium flow switching devices selectively change flow paths between the use side heat exchangers and the heat exchangers related to heat medium in accordance with each operation mode to form a flow path in which the heat medium circulates in a same direction through the pipes of each of the plurality of use side heat exchangers.

\* \* \* \* \*